Figure 1:
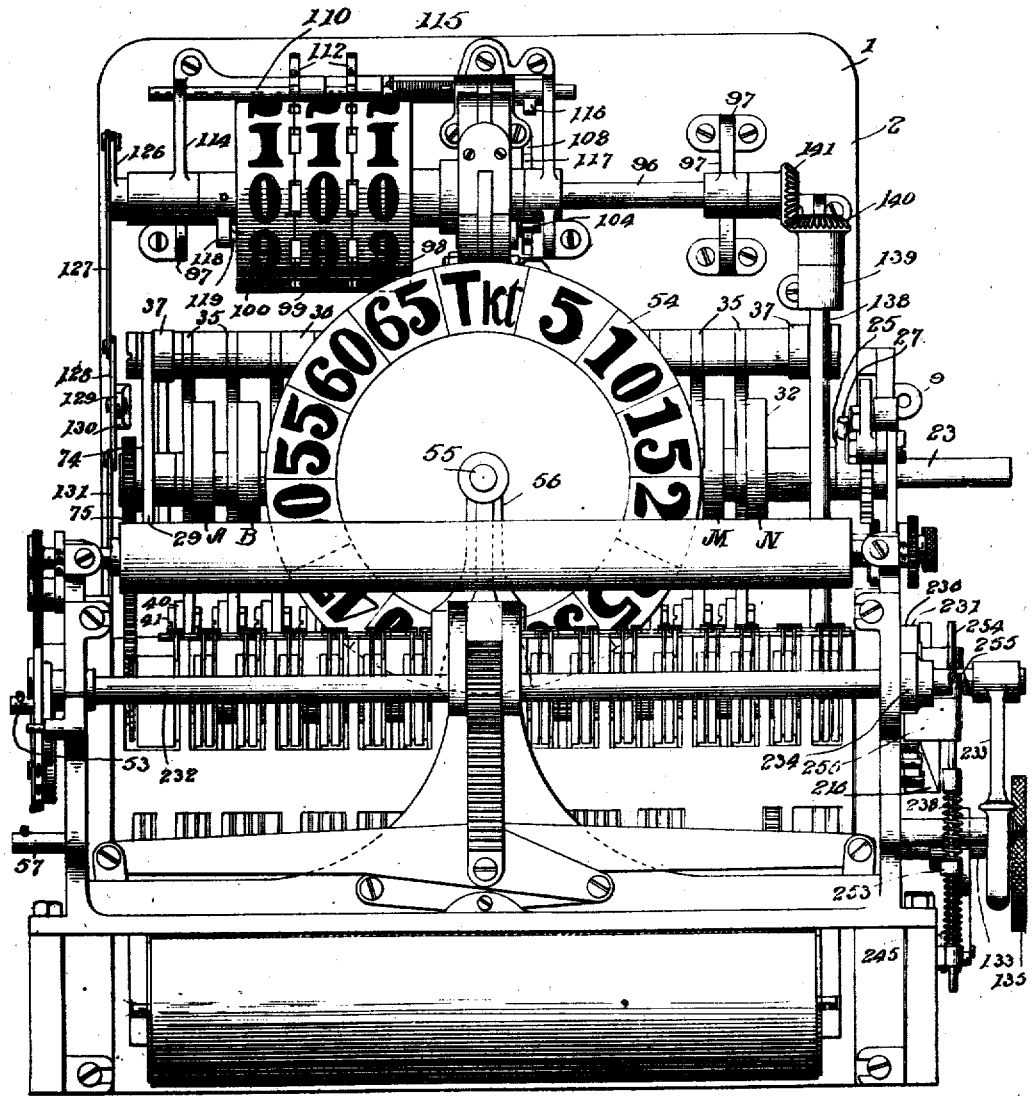

W. I. OHMER.
FARE REGISTER AND RECORDER.
APPLICATION FILED DEC. 27, 1904.

921,276.

Patented May 11, 1909.
23 SHEETS—SHEET 1.

Witnesses
G. Howard Walmsley.
Ivonie Miller.

Inventor
Wilfred I. Ohmer,
By H. A. Toulmin,
Attorney

W. I. OHMER.
FARE REGISTER AND RECORDER.
APPLICATION FILED DEC. 27, 1904.

921,276.

Patented May 11, 1909.
23 SHEETS—SHEET 4.

Witnesses
G. Howard Walmsley.
Irvine Miller.

Inventor
Wilfred I. Ohmer,
By H. A. Toulmin,
Attorney

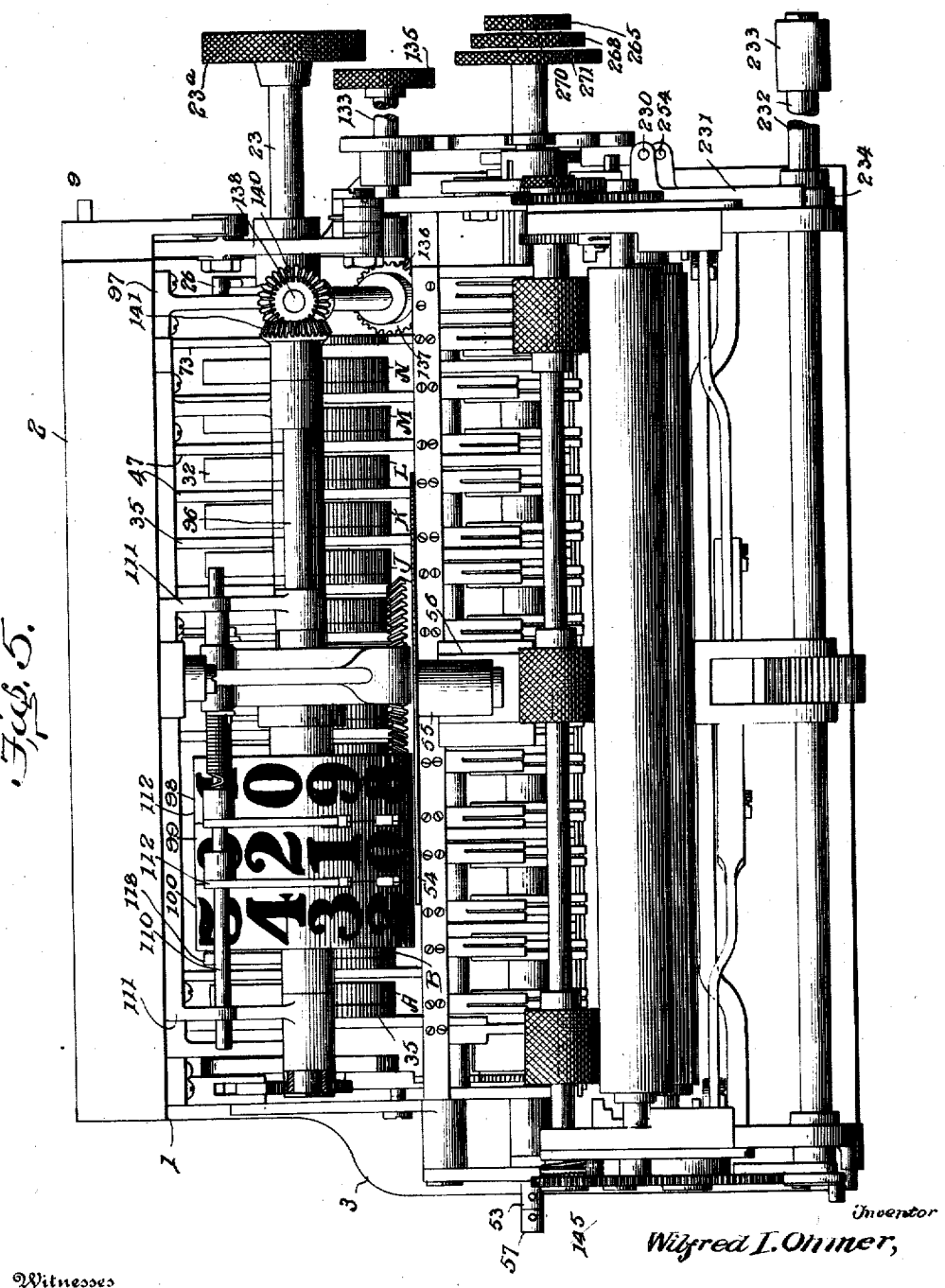

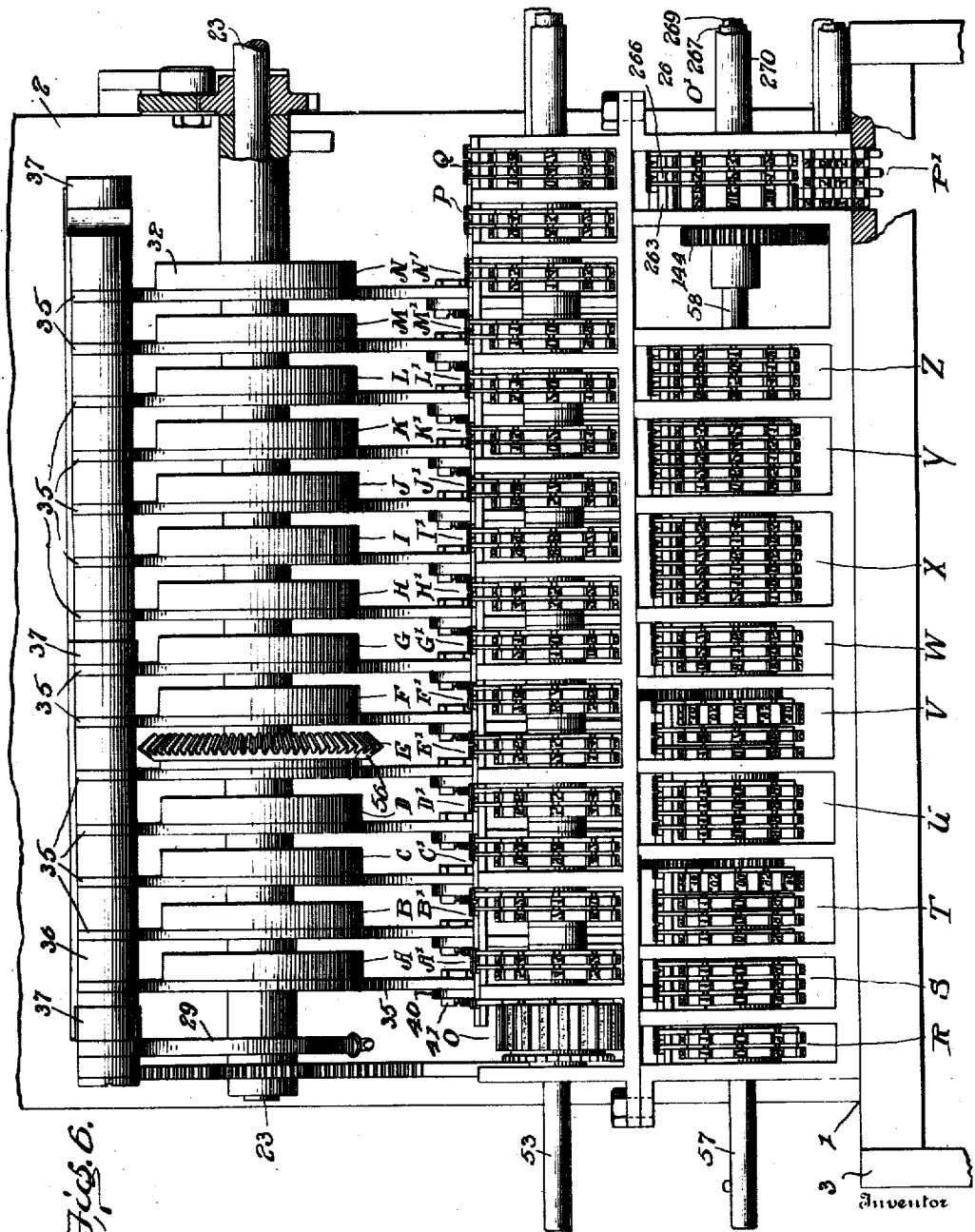

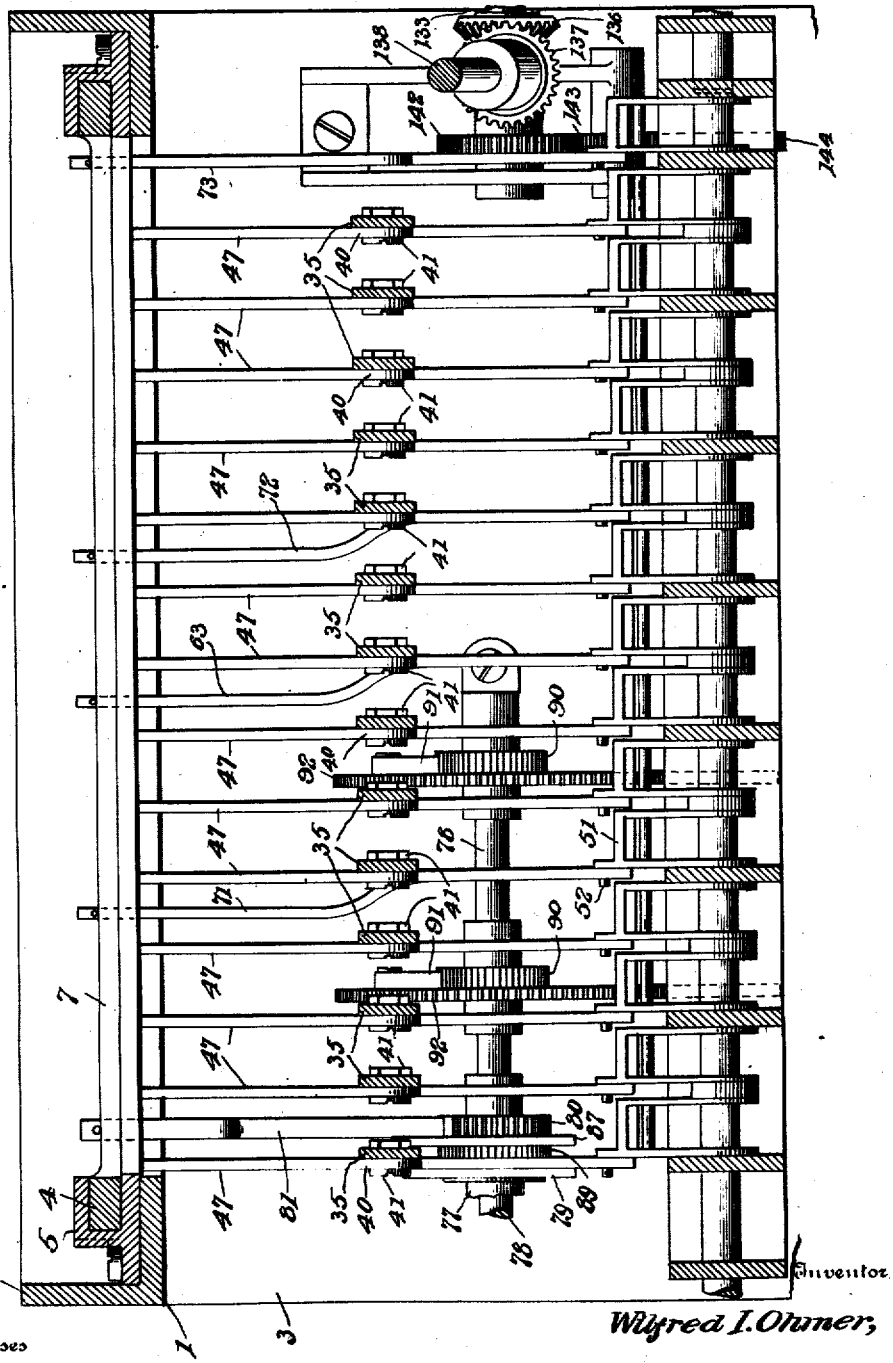

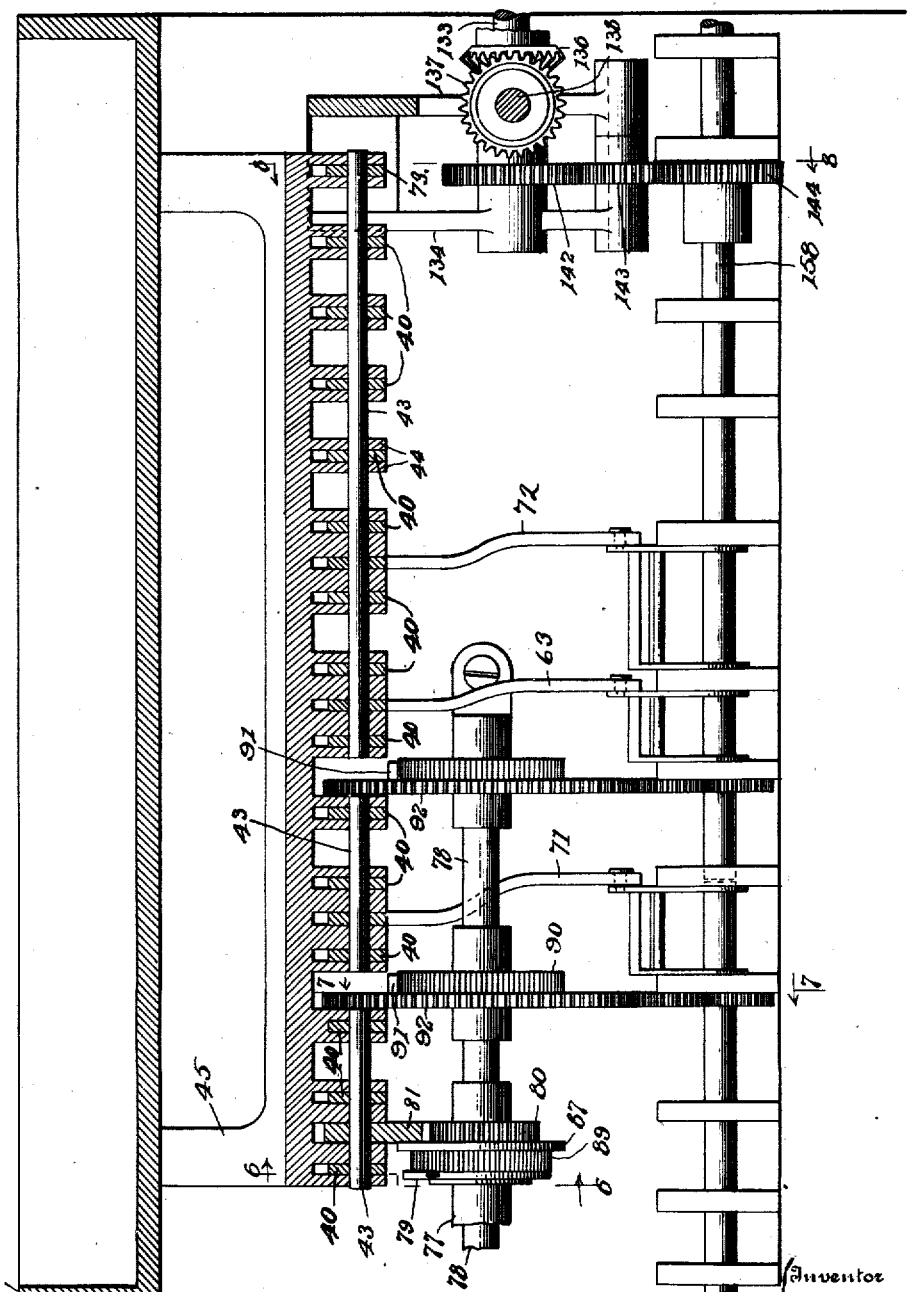

W. I. OHMER.
FARE REGISTER AND RECORDER.
APPLICATION FILED DEC. 27, 1904.
921,276.
Patented May 11, 1909.
23 SHEETS—SHEET 9.
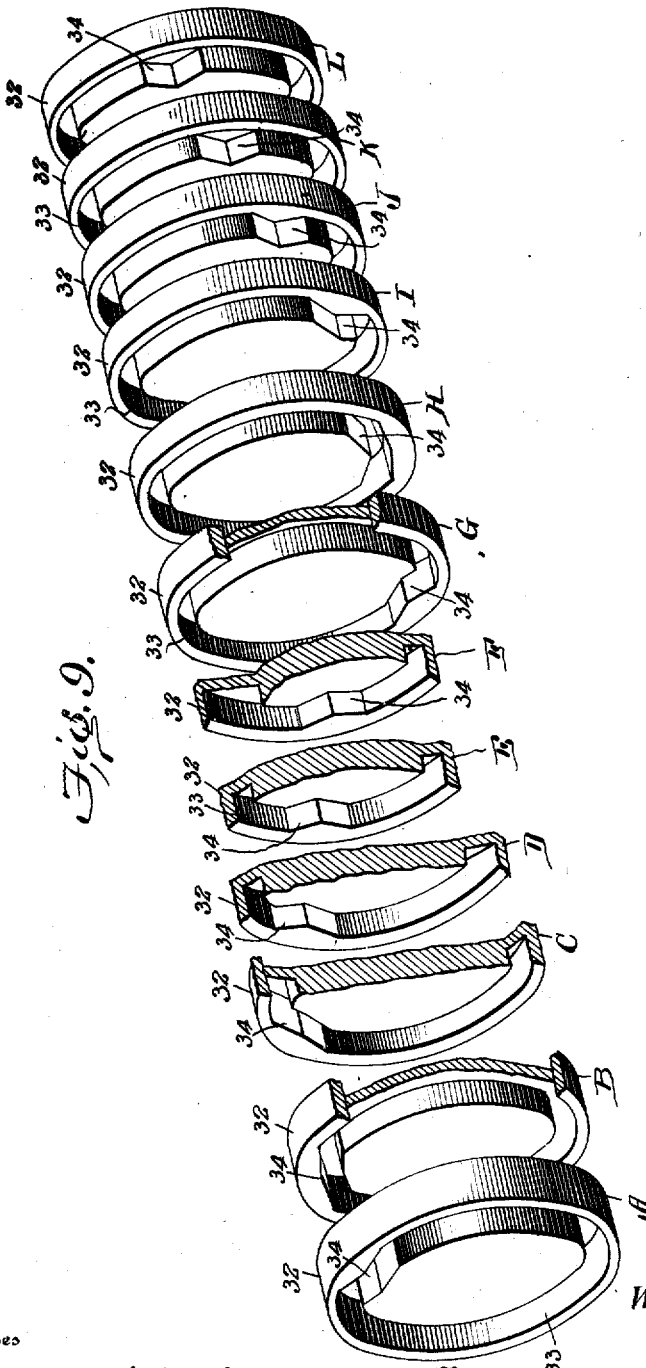

W. I. OHMER.
FARE REGISTER AND RECORDER.
APPLICATION FILED DEC. 27, 1904.
921,276.
Patented May 11, 1909.
23 SHEETS—SHEET 10.
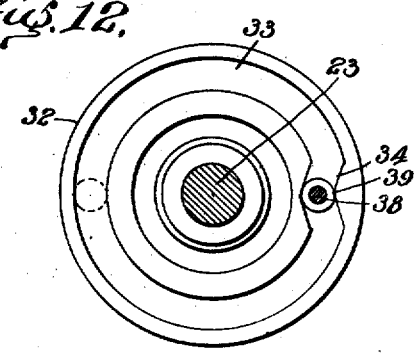
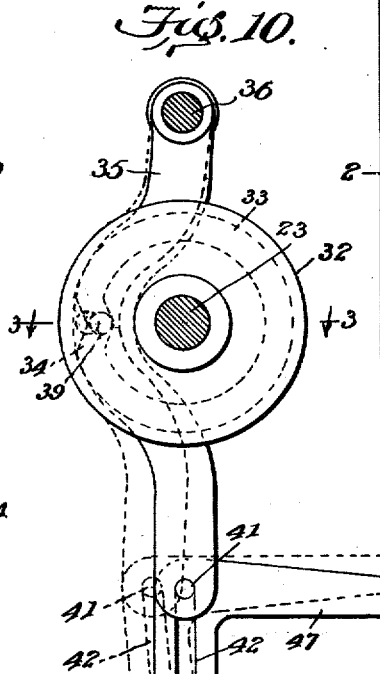
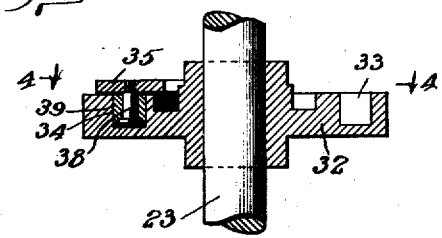
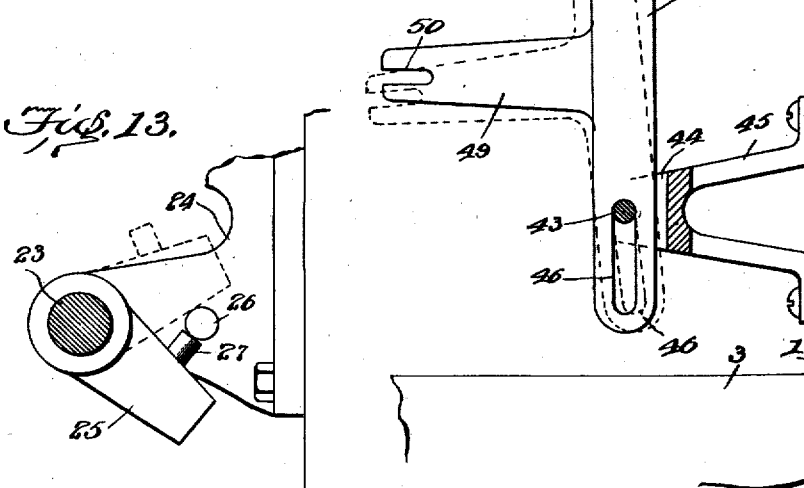
Witnesses
G. Howard Walmsley.
Irvine Miller
Inventor
Wilfred I. Ohmer,
By H. A. Toulmin
Attorney

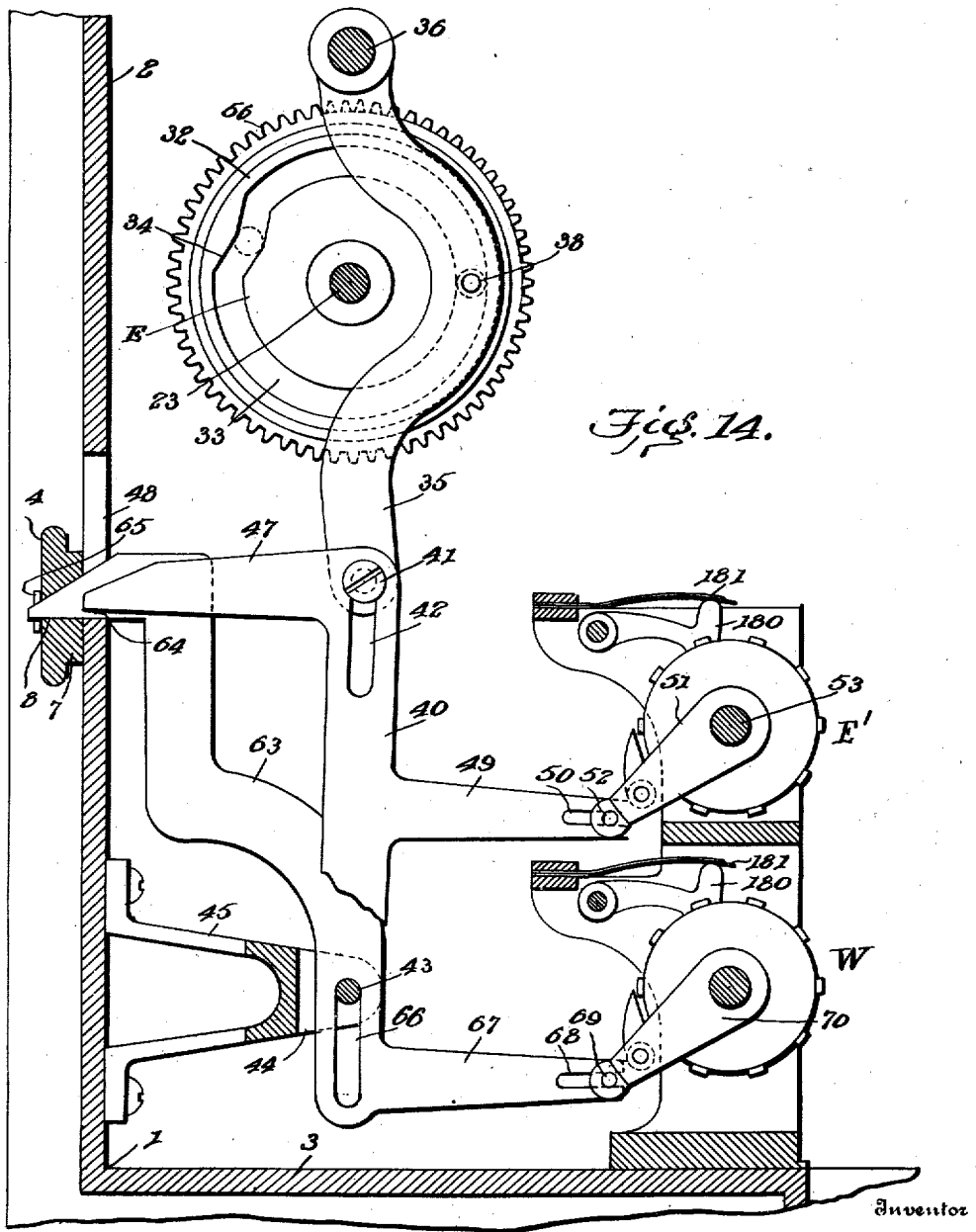

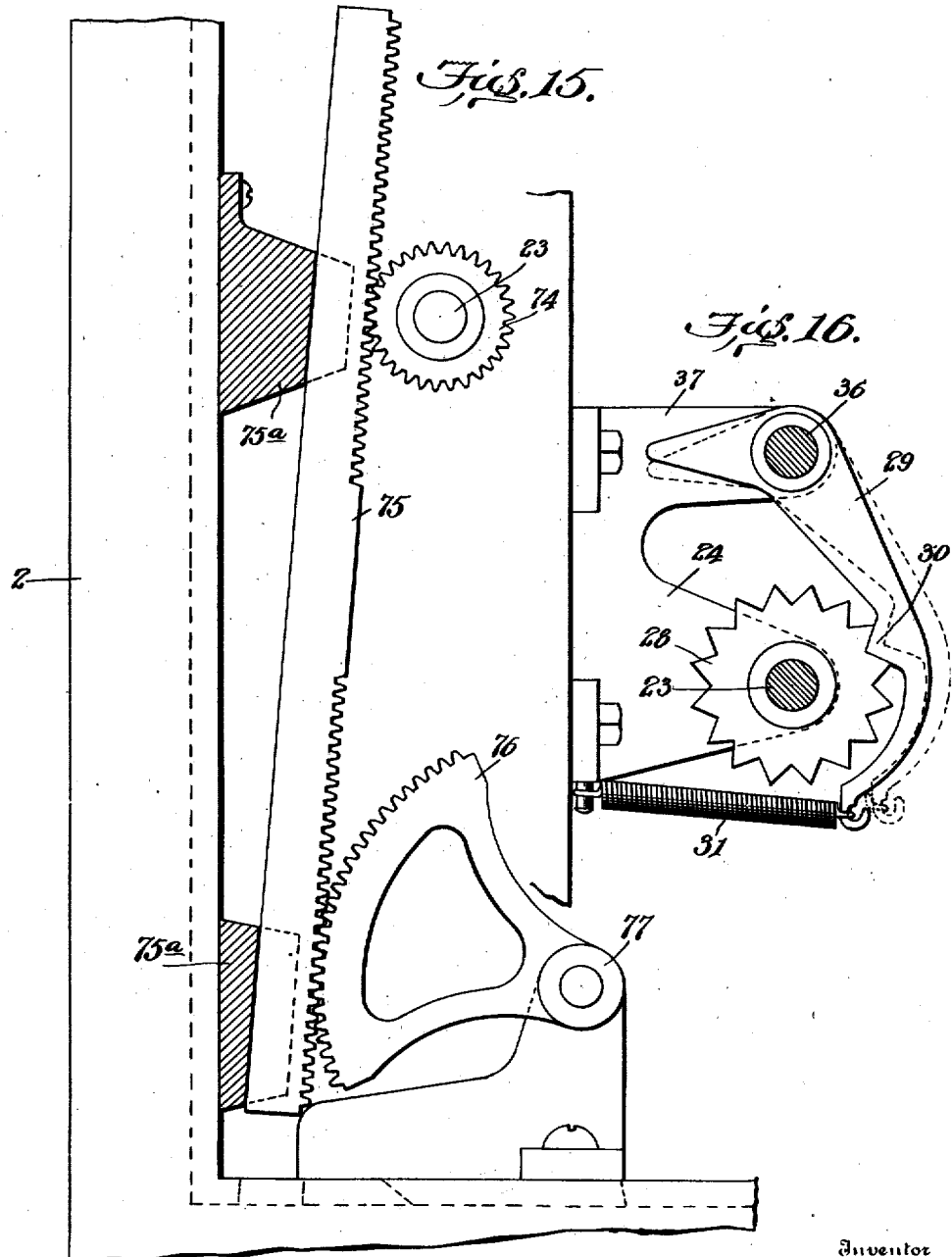

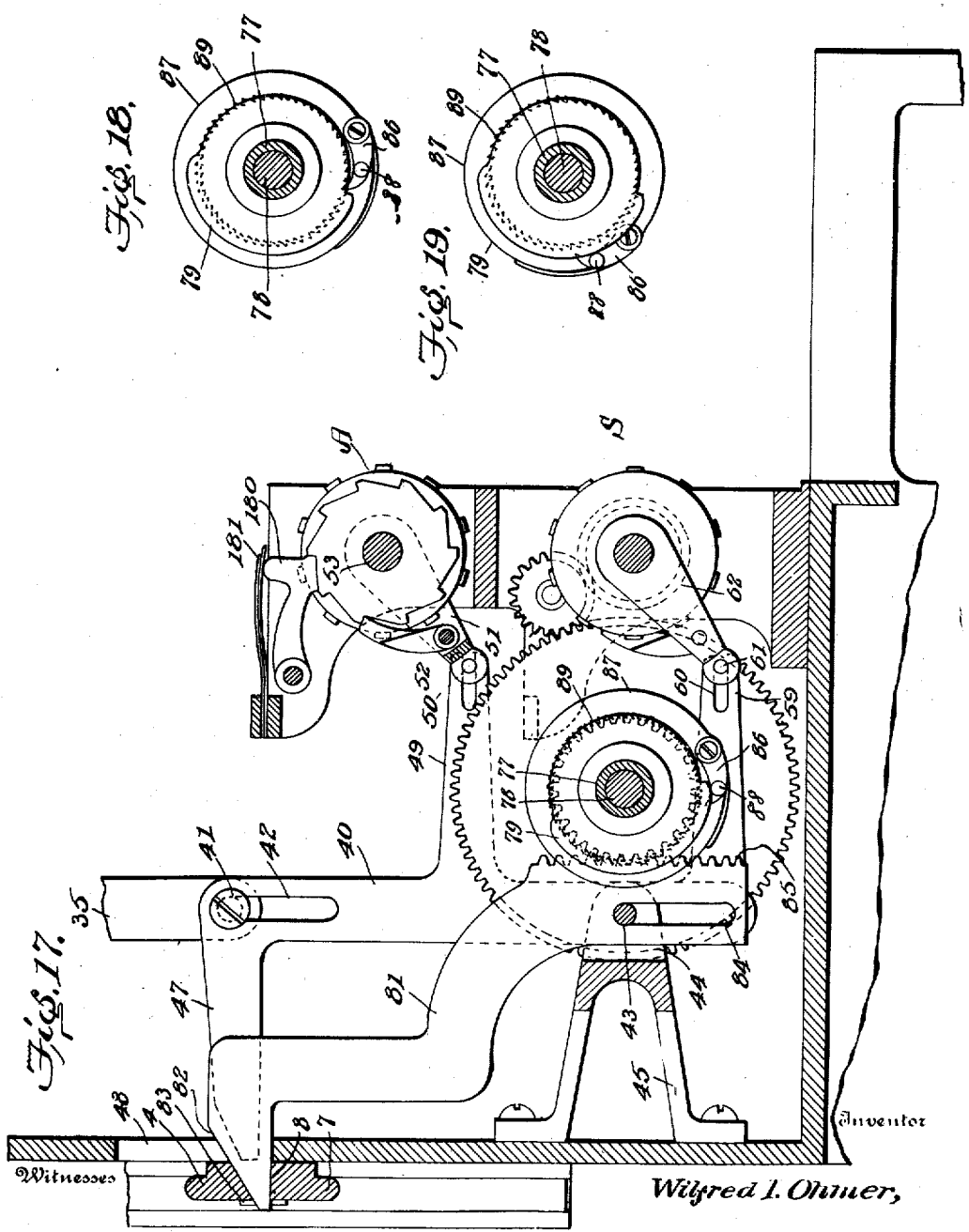

W. I. OHMER.
FARE REGISTER AND RECORDER.
APPLICATION FILED DEC. 27, 1904.

921,276.

Patented May 11, 1909.
23 SHEETS—SHEET 14.

Witnesses
G. Howard Walmsley.
Irvine Miller.

Inventor
Wilfred I. Ohmer,
By H. A. Toulmin,
Attorney

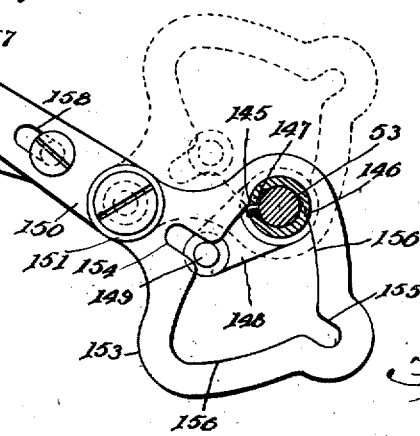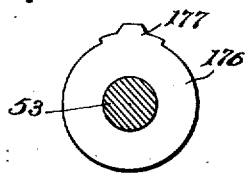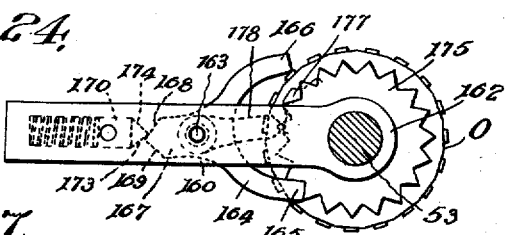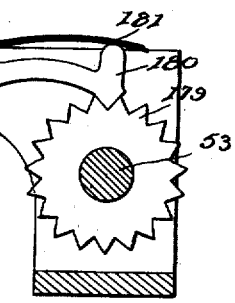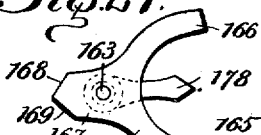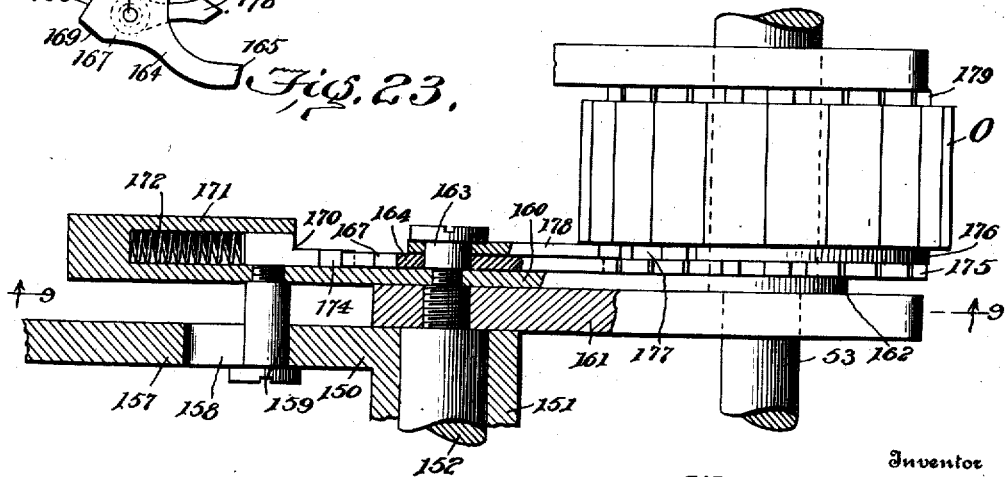

W. I. OHMER.
FARE REGISTER AND RECORDER.
APPLICATION FILED DEC. 27, 1904.
921,276.
Patented May 11, 1909.
23 SHEETS—SHEET 16.
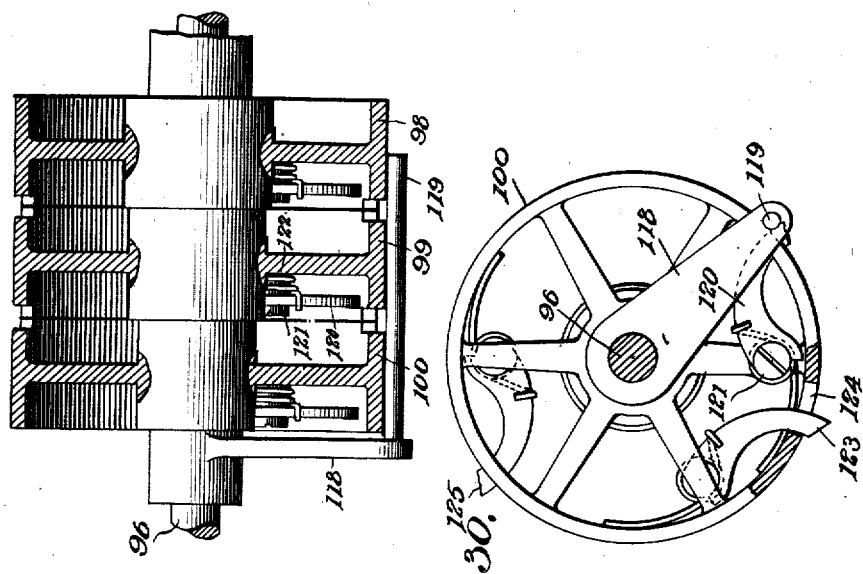
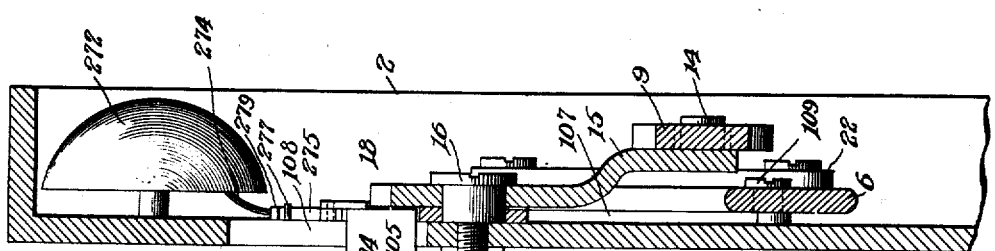
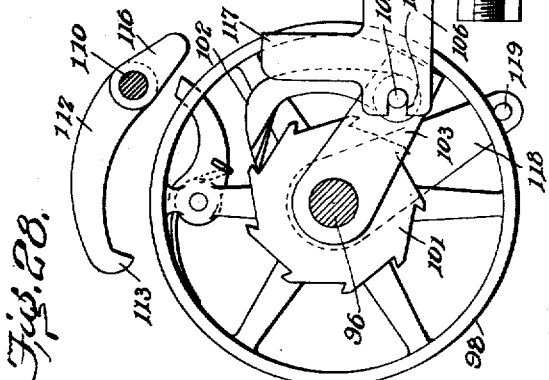
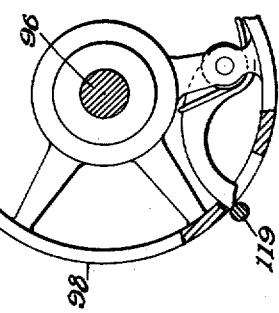
Witnesses
G. Howard Walmsley.
Irvine Miller.
Inventor
Wilfred I. Ohmer,
By H. A. Toulmin.
Attorney W. I. OHMER.
FARE REGISTER AND RECORDER.
APPLICATION FILED DEC. 27, 1904.
921,276.
Patented May 11, 1909.
23 SHEETS—SHEET 17.
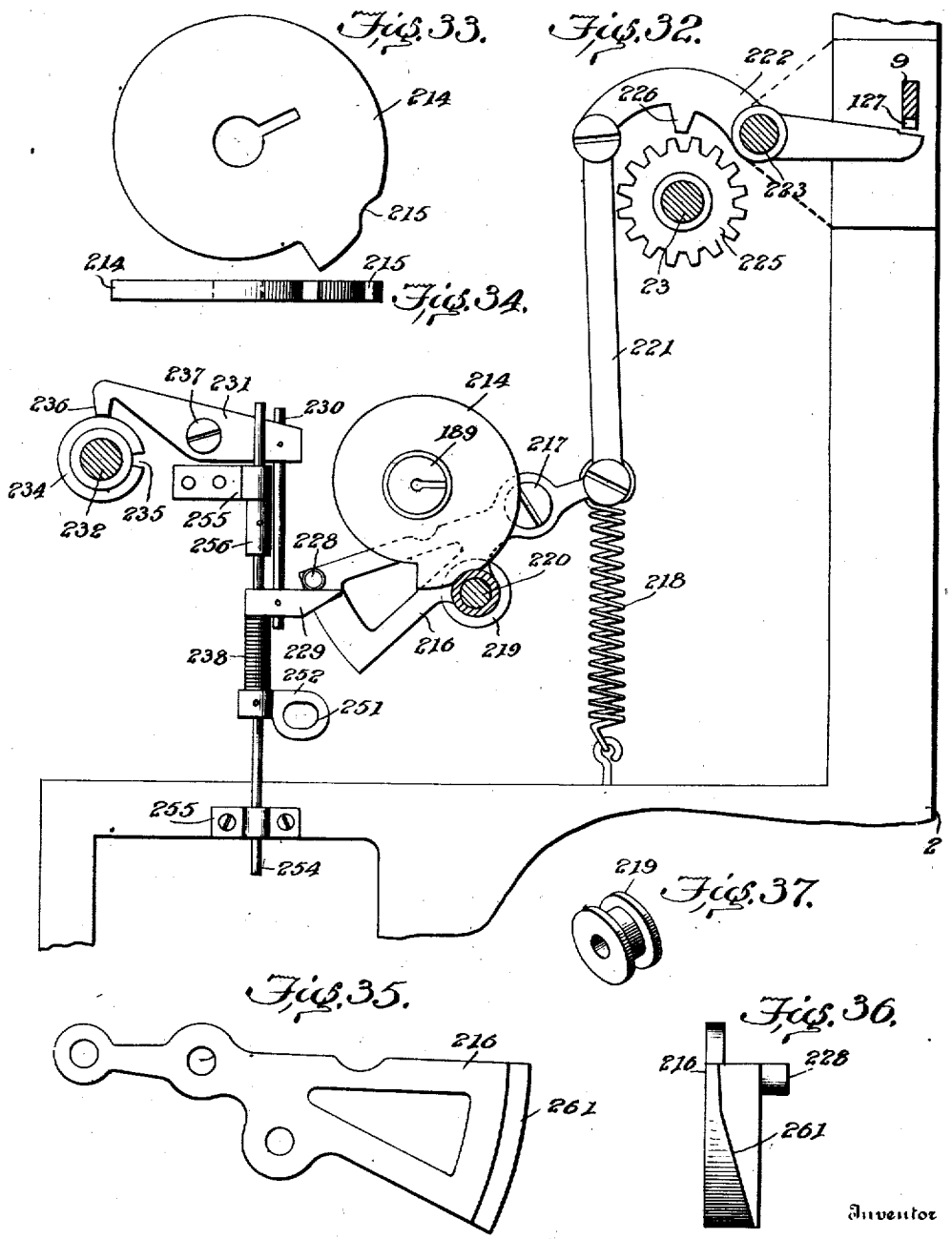
Witnesses
G. Howard Walmsley
Irvine Miller
Inventor
Wilfred I. Ohmer,
By H. A. Toulmin,
Attorney W. I. OHMER.
FARE REGISTER AND RECORDER.
APPLICATION FILED DEC. 27, 1904.
921,276.
Patented May 11, 1909.
23 SHEETS—SHEET 18.
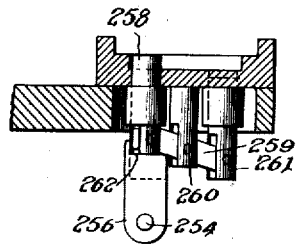
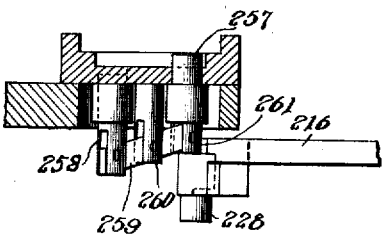
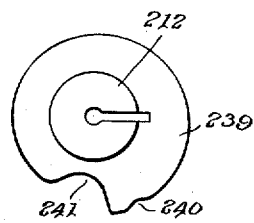
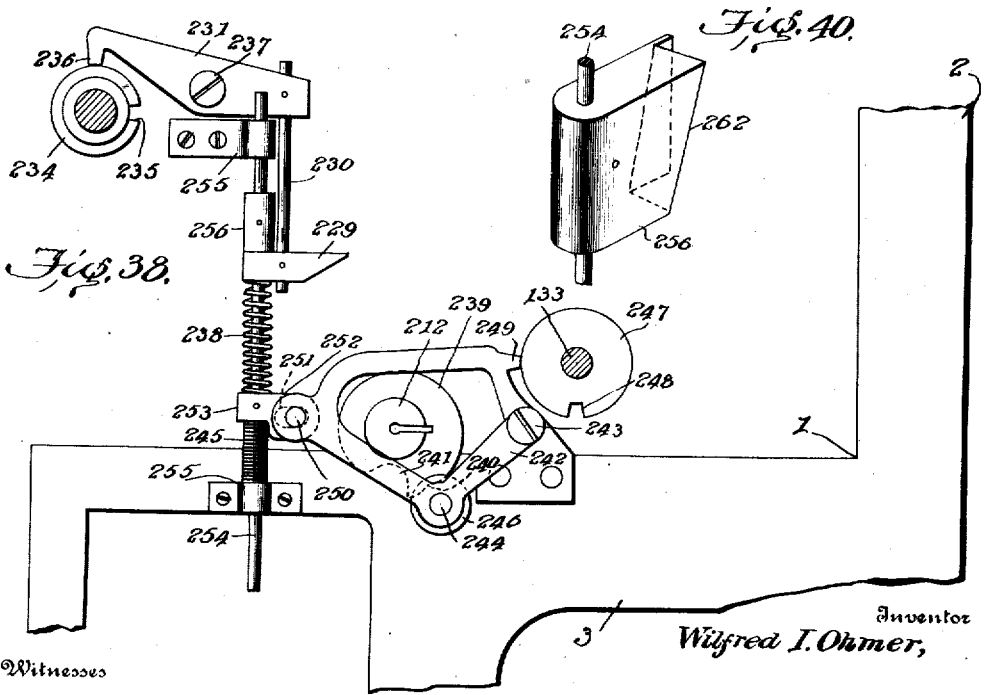
Witnesses
G. Howard Walmsley
Irvine Miller
Inventor
Wilfred I. Ohmer,
By H. A. Toulmin.
Attorney

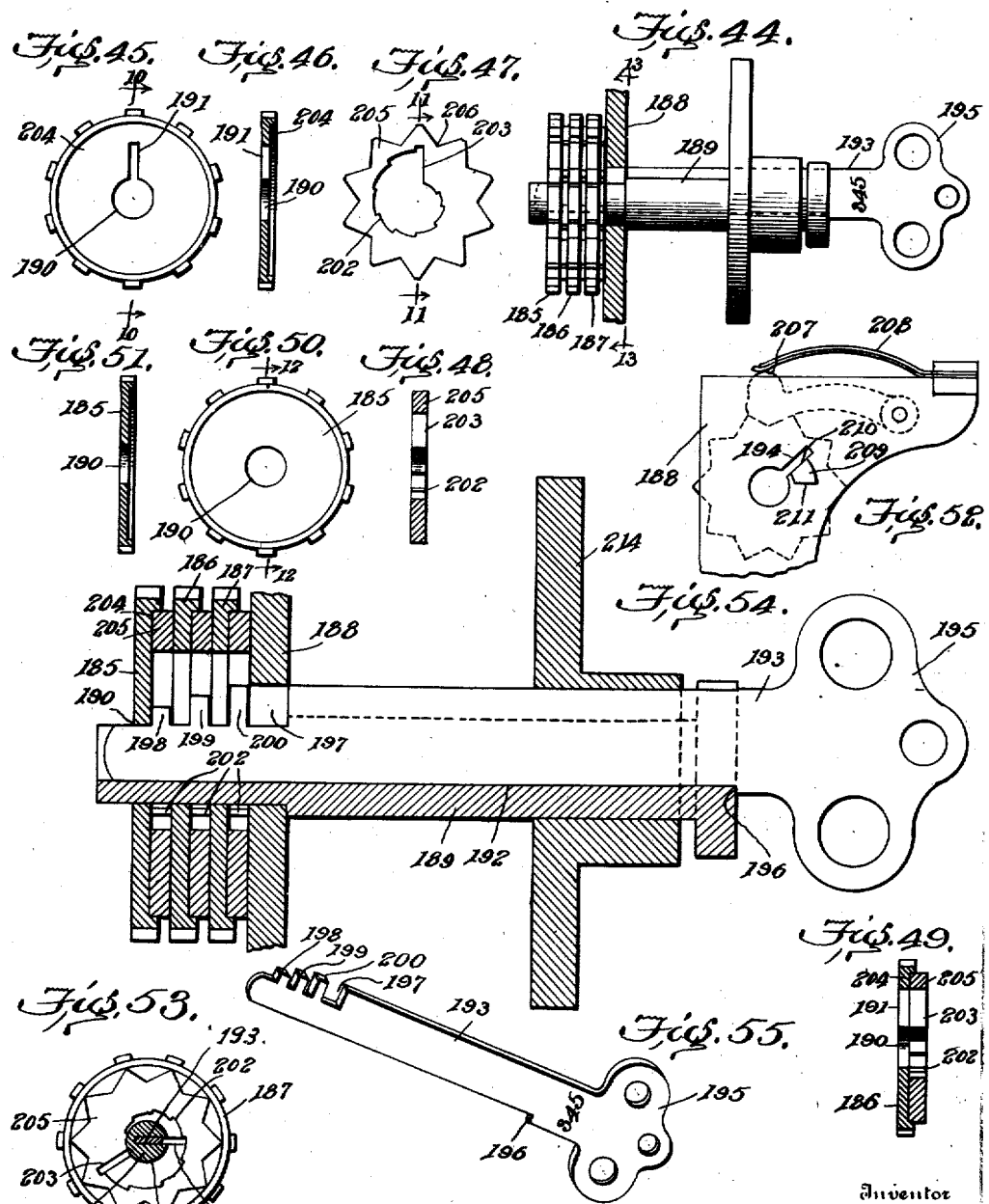

W. I. OHMER.
FARE REGISTER AND RECORDER.
APPLICATION FILED DEC. 27, 1904.
921,276.
Patented May 11, 1909.
23 SHEETS—SHEET 20.
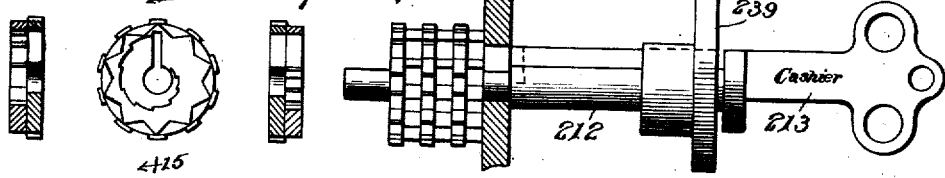
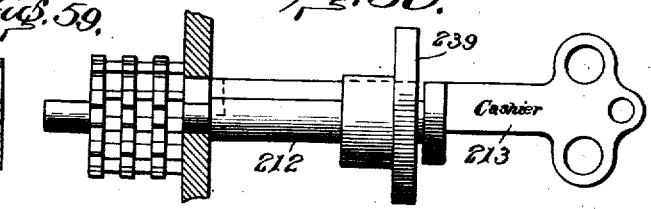
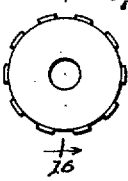
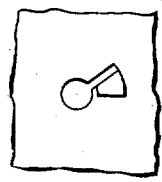
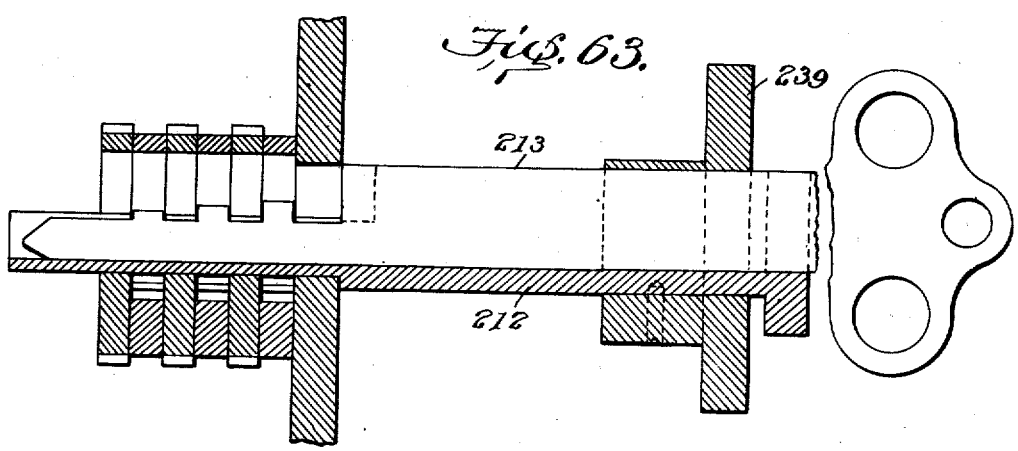
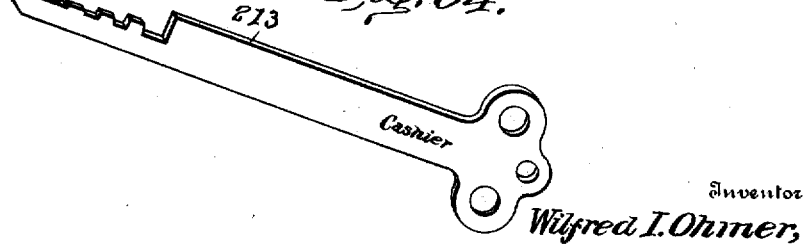
Witnesses
G. Howard Walmsley
Ivonie Miller.
Inventor
Wilfred I. Ohmer,
By H. A. Toulmin,
Attorney

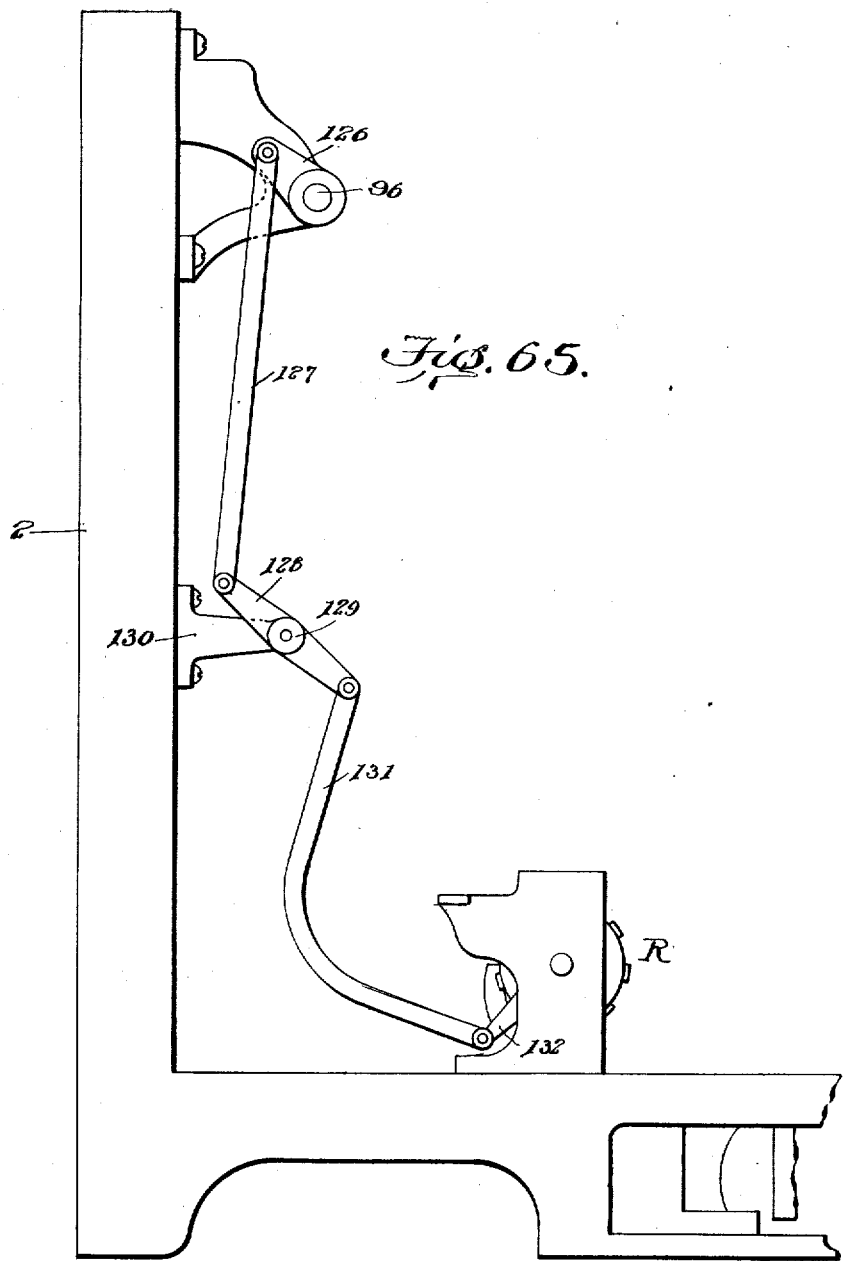

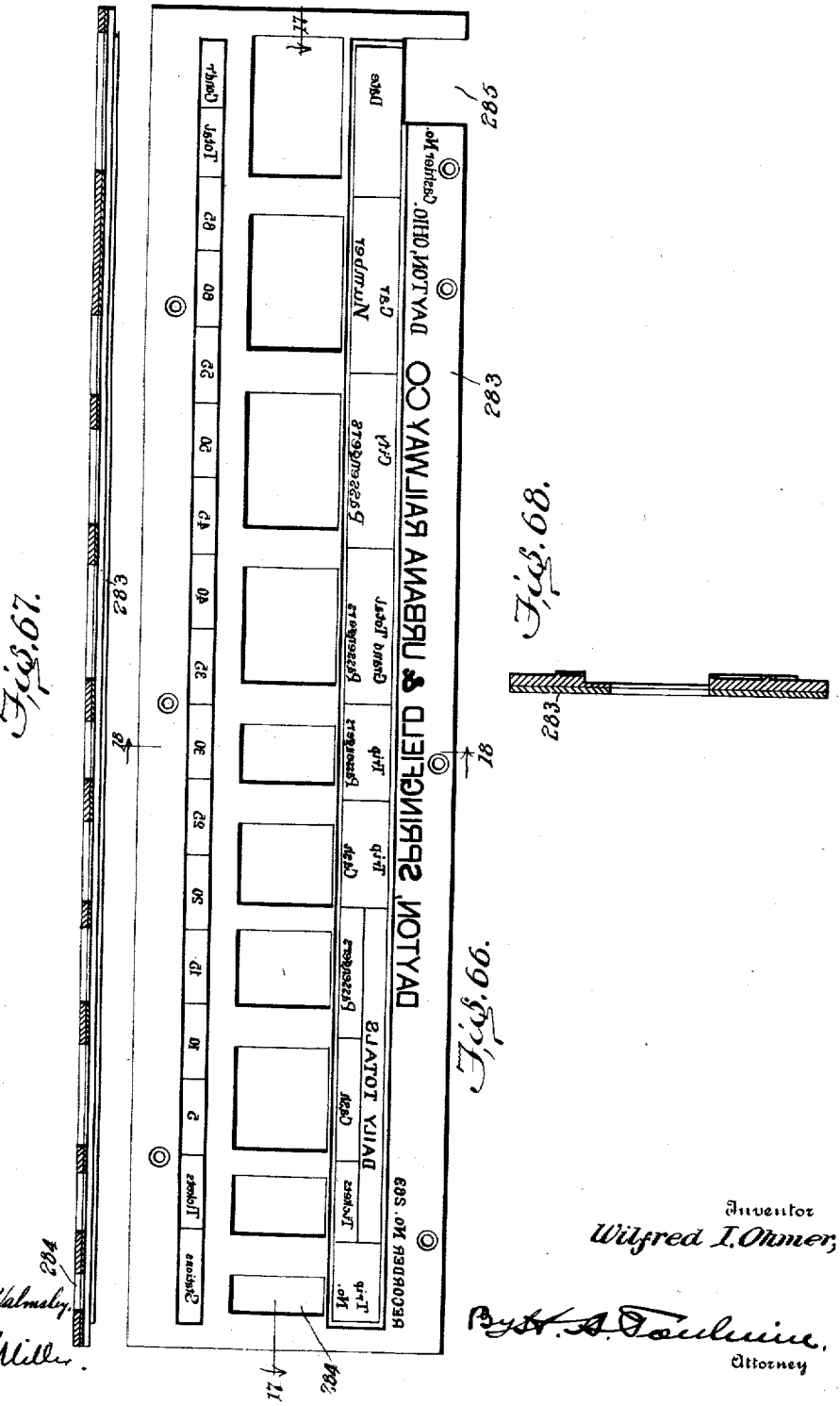

W. I. OHMER.
FARE REGISTER AND RECORDER.
APPLICATION FILED DEC. 27, 1904.

921,276.

Patented May 11, 1909.
23 SHEETS—SHEET 23.

Fig. 69.

| RECORDER No. 263. | DAYTON, SPRINGFIELD & URBANA RAILWAY CO. DAYTON, OHIO. Cashier No. 144. |||||||||
|---|---|---|---|---|---|---|---|---|---|
| | DAILY TOTALS || Trip Cash | Trip Passengers | Grand Total Passengers | City Passengers | Car Number | Date | |
| Trip No. | Tickets | Cash | Passengers | | | | | | |
| 5 | 255 | 135.25 | 0957 | 43.00 | 250 | 085685 | 07863 | 326 | Sept. 26. |

| Stations | Tickets | 5 | 10 | 15 | 20 | 25 | 30 | 35 | 40 | 45 | 50 | 55 | 60 | 65 | Total | Cond'r. |
|---|---|---|---|---|---|---|---|---|---|---|---|---|---|---|---|---|
| URBANA | 0 | 0 | 0 | 0 | 0 | 0 | 0 | 0 | 0 | 0 | 0 | 0 | 0 | 0 | 000 | C-253 |
| BOWLUS | 0 | 8 | 0 | 0 | 0 | 0 | 0 | 0 | 0 | 0 | 0 | 0 | 0 | 0 | 008 | C-253 |
| GLEN ECHO | 0 | 2 | 10 | 0 | 0 | 0 | 0 | 0 | 0 | 0 | 0 | 0 | 0 | 0 | 012 | C-253 |
| SPRINGFIELD | 11 | 4 | 0 | 2 | 2 | 0 | 0 | 0 | 0 | 0 | 0 | 0 | 0 | 0 | 049 | C-253 |
| MASONIC HOME | 0 | 6 | 0 | 3 | 0 | 30 | 0 | 0 | 0 | 0 | 0 | 0 | 0 | 0 | 013 | C-253 |
| MOORES | 0 | 1 | 7 | 0 | 0 | 4 | 0 | 0 | 0 | 0 | 0 | 0 | 0 | 0 | 008 | C-253 |
| DURBIN | 0 | 2 | 0 | 0 | 0 | 0 | 2 | 0 | 0 | 0 | 0 | 0 | 0 | 0 | 004 | C-253 |
| SNYDERS | 0 | 10 | 0 | 4 | 0 | 0 | 0 | 0 | 0 | 0 | 0 | 0 | 0 | 0 | 014 | C-253 |
| ENON | 0 | 0 | 8 | 0 | 0 | 0 | 0 | 2 | 0 | 0 | 0 | 0 | 0 | 0 | 010 | C-253 |
| DONNELSVILLE | 4 | 3 | 0 | 0 | 0 | 0 | 0 | 0 | 0 | 0 | 0 | 0 | 0 | 0 | 007 | C-253 |
| MEDWAY | 6 | 6 | 0 | 8 | 0 | 0 | 0 | 0 | 0 | 0 | 0 | 0 | 0 | 0 | 020 | C-253 |
| OSBORN | 8 | 5 | 2 | 3 | 0 | 2 | 1 | 0 | 0 | 2 | 0 | 0 | 0 | 0 | 021 | C-253 |
| FAIRFIELD | 0 | 0 | 0 | 0 | 0 | 0 | 0 | 0 | 0 | 2 | 0 | 0 | 0 | 0 | 002 | C-253 |
| KESSLERS | 0 | 0 | 0 | 0 | 0 | 0 | 0 | 0 | 0 | 0 | 0 | 0 | 0 | 0 | 000 | C-253 |
| MATHERS | 0 | 4 | 2 | 0 | 0 | 0 | 8 | 0 | 3 | 0 | 1 | 0 | 0 | 0 | 008 | C-253 |
| HARSHMAN | 0 | 3 | 0 | 4 | 0 | 0 | 0 | 0 | 0 | 0 | 0 | 0 | 0 | 0 | 016 | C-253 |
| DOUBLE TRACK | 0 | 0 | 0 | 0 | 0 | 0 | 0 | 0 | 0 | 0 | 0 | 0 | 0 | 0 | 000 | C-253 |
| DAYTON | 12 | 4 | 2 | 0 | 0 | 5 | 1 | 0 | 22 | 0 | 0 | 1 | 0 | 10 | 057 | C-253 |

Inventor
Wilfred I. Ohmer,

Witnesses
G. Howard Walmsley,
Irvine Miller

By H. A. Toulmin.
Attorney

UNITED STATES PATENT OFFICE.

WILFRED I. OHMER, OF DAYTON, OHIO, ASSIGNOR TO THE RECORDING AND COMPUTING MACHINES COMPANY, OF DAYTON, OHIO, A CORPORATION OF OHIO.

FARE REGISTER AND RECORDER.

No. 921,276.

Specification of Letters Patent.

Patented May 11, 1909.

Application filed December 27, 1904. Serial No. 238,396.

*To all whom it may concern:*

Be it known that I, WILFRED I. OHMER, a citizen of the United States, residing at Dayton, in the county of Montgomery and State of Ohio, have invented certain new and useful Improvements in Fare Registers and Recorders, of which the following is a specification, reference being had therein to the accompanying drawings.

This invention relates to fare registers and recorders, being, in some respects, in the nature of an improvement upon the construction set forth in my prior U. S. Letters Patent No. 764,494, granted July 5, 1904.

In a general way, the objects of the present invention are: to increase the capacity of the machine set forth in my said prior Letters Patent, so as to adapt it to register and record a greater number of different kinds of fares, at the same time rendering the machine more compact and simple, reducing the frictional resistance to the operation of the mechanism, and providing within the machine itself mechanism for setting the machine so as to render operative any desired printing counter or set of printing counters, preferably with coöperating indicating mechanism, the construction being such that a single actuating connection will actuate the mechanism thus set in operative connection therewith.

Further objects of this invention comprise a simplification of the indicating mechanism, a grouping and construction of the printing counters, their operating mechanisms and resetting mechanisms in such a way as to provide for the making of a record at each station of the fares and totals between said station and the preceding station, a second record at the end of the trip, giving trip totals of the items which it is desired to totalize, and a third record at the end of the day similarly totalizing the desired records for the entire day; to make an improved provision against the unauthorized or improper use of the machine and at the same time identifying the persons making the various records, while restricting their record-making capacity within prescribed limits; to increase the range or capacity of the cash-adding printing counters, at the same time improving their operating mechanism in various respects; to provide an improved mechanism for recording the names of the stations in connection with the station records, provision being also made for automatically reversing the order in which the station names are recorded where the device is used on a line requiring such reversal; to provide, if desired, a station indicator coöperating with and actuated by the station recording mechanism; to provide improved locking mechanism for locking the register proper when the printing mechanism is unlocked and for locking the printing mechanism when the register is unlocked, so that neither of these mechanisms is operative when the other one is operative, also locking the register proper to prevent anyone but the conductor from operating the same, and locking the trip resetting mechanism against operation by anyone except the cashier or inspector; to provide an improved key-controlled identifying mechanism by which the above mentioned locking mechanisms are controlled, and by which the printing mechanism is so controlled as to print only the kind of record desired.

To these and other ends my present invention consists in certain novel features which I will now proceed to describe, and will then particularly point out in the claims.

Figure 2:
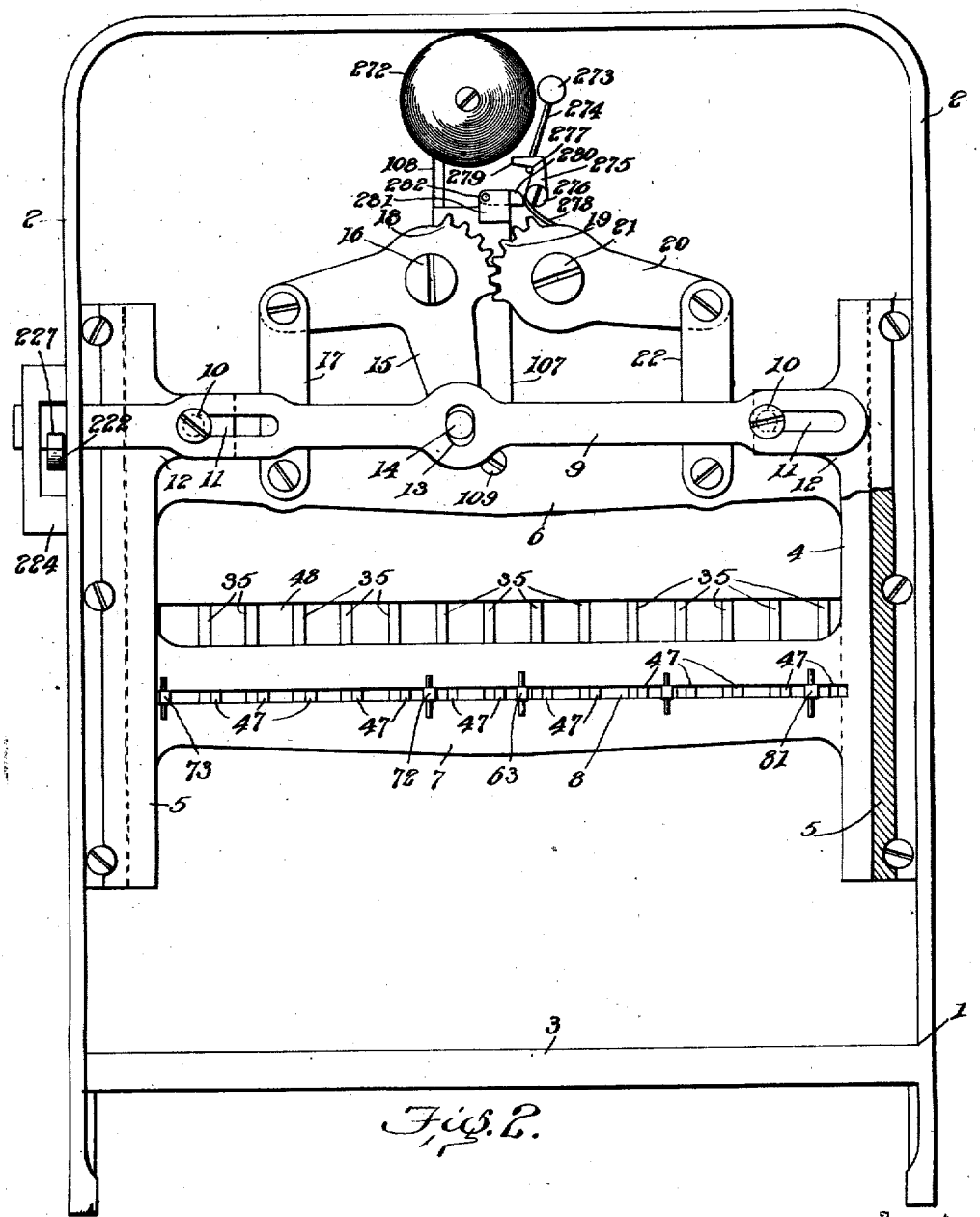
Figure 3:
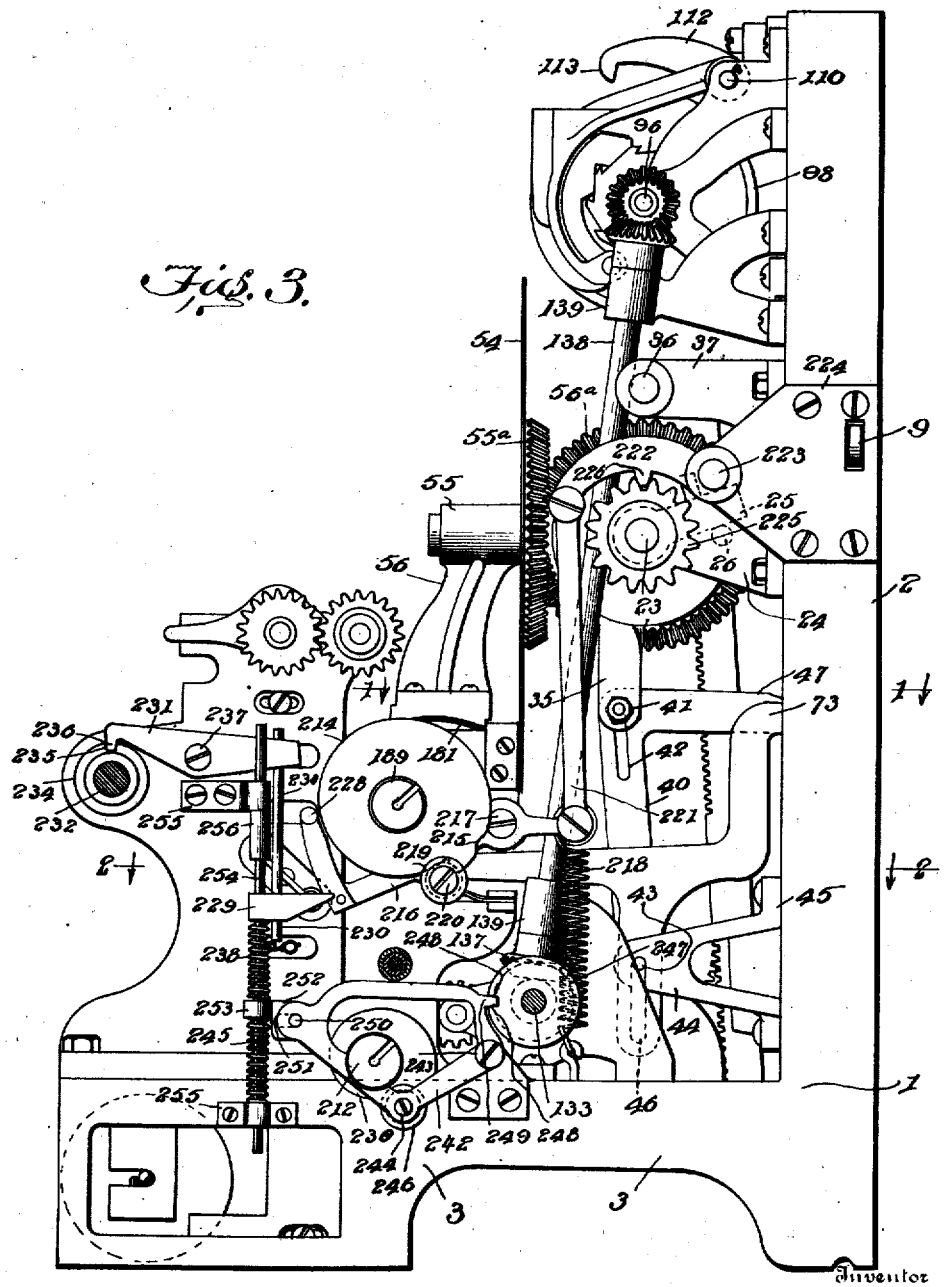
Figure 4:
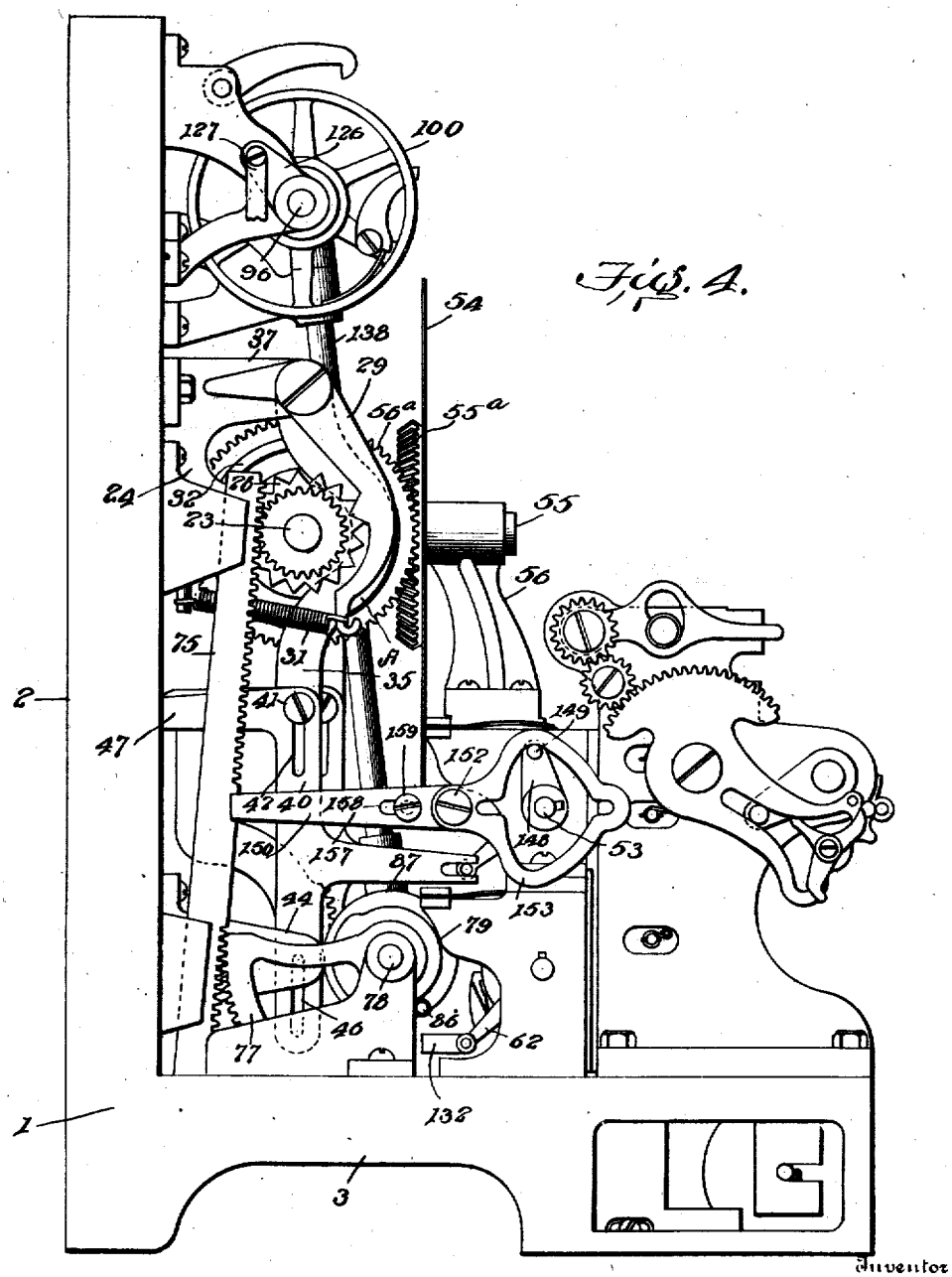
Figure 21:
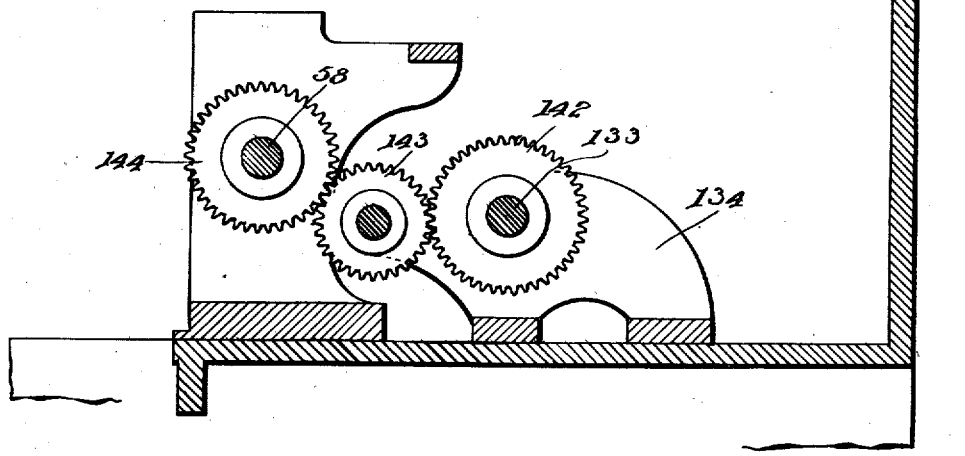
Figure 20:
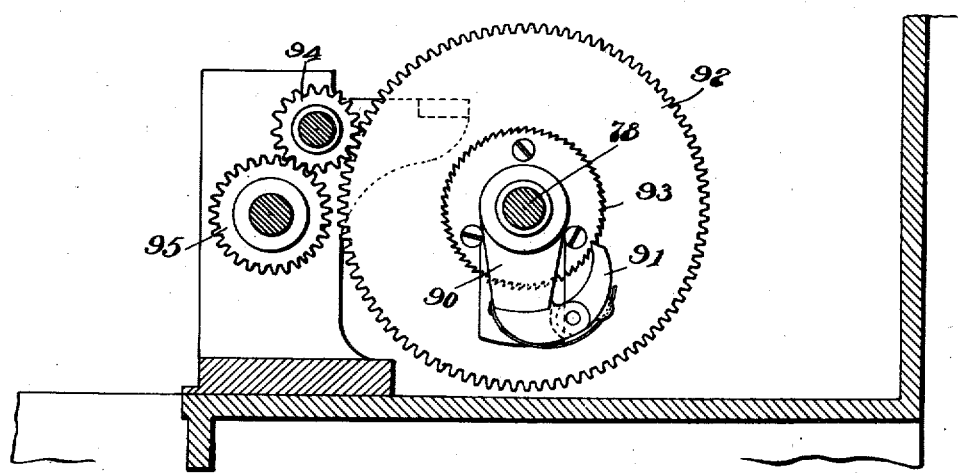

In the accompanying drawings, in which I have shown a construction embodying my invention in one form, Figure 1 is a front elevation of such a structure, the casing being omitted; Fig. 2 is a rear elevation of the same; Fig. 3 is an elevation of one side of the machine; Fig. 4 is an elevation of the other side of the machine; Fig. 5 is a plan view of the machine; Fig. 6 is a detail front elevation of the various printing counters and wheels, with portions of their setting and operative mechanisms, the same being partly in section, and the printing mechanism being removed to better show the printing wheels; Fig. 7 is a detail plan section, taken on the line 1—1 of Fig. 3 and looking in the direction of the arrows, the printing mechanism being omitted; Fig. 8 is a similar plan section, taken on a lower plane, to wit, the line 2—2 of Fig. 3, looking in the direction of the arrows; Fig. 9 is a perspective view showing a portion of the cam wheels by which the setting of the machine is controlled, said wheels being shown removed from their shaft and slightly separated, but in correct angular relation relatively to each other; Fig. 10 is a detail sectional view showing one of the cam wheels, its coöperating setting arm, and the operating link controlled thereby; Fig. 11 is a detail section of the same, on a somewhat enlarged scale, taken on the line 3—3 of Fig. 10 and looking in the direction of the arrows; Fig. 12 is a detail sectional view, taken on the line 4—4 of Fig. 11 and looking in the direction of the arrows; Fig. 13 is a detail view of the stop mechanism which limits the movements of the setting shaft; Fig. 14 is a detail sectional view, taken on the line 5—5 of Fig. 6 and looking in the direction of the arrows; Fig. 15 is a detail sectional view illustrating the connecting mechanism between the main setting or cam shaft and the auxiliary setting or cam shaft which controls the cash-adding printing counters; Fig. 16 is a detail view of the detent mechanism of the main setting shaft; Fig. 17 is a detail sectional view, taken on a line corresponding to the line 6—6 of Fig. 8 and looking in the direction of the arrows, showing the mechanism for operating the cash-adding printing counters and the cam controlling the same; Fig. 18 is a view of a portion of Fig. 17, showing a different position of the parts; Fig. 19 is a view similar to Fig. 18, showing yet another position of the parts; Fig. 20 is a detail sectional view, taken on the line 7—7 of Fig. 8 and looking in the direction of the arrows; Fig. 21 is a similar section, taken on the line 8—8 of Fig. 1 and looking in the direction of the arrows; Fig. 22 is an enlarged detail view of the actuating mechanism whereby the station printing wheel is operated and its direction of rotation reversed, the same being viewed from the outer side, showing two different positions thereof; Fig. 23 is a detail plan section of a portion of the actuating and reversing mechanism; Fig. 24 is a detail sectional view, taken on the line 9—9 of Fig. 23 and looking in the direction of the arrows, the same being on a reduced scale; Fig. 25 is a detail view of a portion of Fig. 24; Fig. 26 is a detail view of the detent coöperating with the station printing wheel; Fig. 27 is a detail view of the reversing pawl, detached; Fig. 28 is a side elevation of the passenger indicating register and its coöperating mechanism; Fig. 29 is a sectional view of the same; Fig. 30 is a detail sectional view illustrating the operation of the parts during the resetting to zero of the indicator; Fig. 31 is a similar detail illustrating the operation of the indicator wheels when the indicator is acting as such; Fig. 32 is a detail view, in elevation, of the locking mechanism controlled by the conductor's key; Fig. 33 is a view of the cam thereof, detached and in elevation; Fig. 34 is a bottom plan view of the same; Fig. 35 is a view of the lever thereof, detached and in elevation, the same being viewed from the side opposite to that which is shown in Fig. 32; Fig. 36 is an end elevation of the same; Fig. 37 is a detail perspective view of the antifriction roller carried by said lever; Fig. 38 is a detail view, in elevation, of the locking mechanism controlled by the cashier's key; Fig. 39 is a detail view of the cam thereof, detached and in elevation; Fig. 40 is a detail perspective view of that portion of said locking mechanism which directly coöperates with the stop pins which determine the path of the printing mechanism; Fig. 41 is a detail plan section showing said stop pins in one position; Fig. 42 is a similar view showing said pins in another position; Fig. 43 is an end elevation of the stop pins and their connecting lever; Fig. 44 is a detail view of the conductor's key and the identifying and other mechanism coöperating therewith; Fig. 45 is a detail elevation of the body of one of the outer printing wheels of the identifying device; Fig. 46 is a sectional view of the same, taken on the line 10—10 of Fig. 45 and looking in the direction of the arrows; Fig. 47 is an elevation of the supplementary member of said wheel, detached; Fig. 48 is a sectional view of the same, taken on the line 11—11 of Fig. 47 and looking in the direction of the arrows; Fig. 49 is a detail sectional view of one of the wheels complete, comprising the body and supplementary member united together; Fig. 50 is an elevation of the body of the innermost wheel, detached; Fig. 51 is a sectional view of the same, taken on the line 12—12 of Fig. 50 and looking in the direction of the arrows; Fig. 52 is a detail elevation, partly in section, showing the stop; Fig. 53 is a detail sectional view, taken on the line 13—13 of Fig. 44 and looking in the direction of the arrows; Fig. 54 is an enlarged sectional view of what is shown in Fig. 44, taken on a plane corresponding to the line 14—14 of Fig. 52 and looking in the direction of the arrows; Fig. 55 is a detail perspective view of the conductor's key, detached; Fig. 56 is a view similar to Fig. 44 showing the cashier's key, and the identifying and coöperating mechanism; Fig. 57 is a detail elevation of one of the outer printing members of the identifying device, detached; Fig. 58 is a sectional view of the same, taken on the line 15—15 of Fig. 57 and looking in the direction of the arrows; Fig. 59 is a similar view, looking in the opposite direction; Fig. 60 is a detail view, in elevation, of the inner printing member, detached, only the body thereof being shown, the supplementary member being removed; Fig. 61 is a detail sectional view of the same, taken on the line 16—16 of Fig. 60 and looking in the direction of the arrows; Fig. 62 is a detail elevation, partly in section, showing the stop; Fig. 63 is a view similar to Fig. 54, showing the corresponding parts of the cashier's identifying mechanism; Fig. 64 is a detail perspective view of the cashier's key, detached; Fig. 65 is a detail side elevation showing the mechanism operating the trip number printing counter; Fig. 66 is an elevation of the printing plate forming a part of the printing surface; Fig. 67 is a sectional view of the same, taken on the line 17—17 of Fig. 66 and looking in the direction of the arrows; Fig. 68 is a sectional view of the same, taken on the line 18—18 of Fig. 66 and looking in the direction of the arrows; and Fig. 69 is a view of the record produced by the machine illustrated.

In the said drawings, I have shown a machine embodying my present invention in one form, the inclosing casing, which may be of any suitable construction, being omitted. Said casing will, as usual, be provided with proper sight and key openings, and will be locked so as to prevent access by unauthorized persons to the inclosed mechanism. In the said drawings, 1 indicates the frame or support on which the machine is mounted, the same comprising a vertical or upright portion 2, and a horizontal portion 3, at right angles to the vertical portion and united to the same at the bottom thereof. Upon the back of the frame member 2 there is mounted to slide vertically thereon an actuator, consisting of a cross-head 4, the frame or support being provided with vertical guideways 5 in which said cross-head reciprocates. Said cross-head comprises an upper cross-bar 6 and a lower cross-bar 7, the latter provided with a slot 8, by means of which it engages and actuates the actuating mechanisms of the several printing counters, in the manner hereinafter described. Motion is imparted to this cross-head from a transversely moving slide-bar 9, which is actuated by the conductor every time a fare of any description is received, the actuating mechanism being preferably some such operating mechanism as is set forth in my prior Letters Patent No. 764,738, of July 12, 1904, or No. 769,398, of September 6, 1904. The slide-bar 9 projects beyond the casing sufficiently to be engaged by the operating device, and is guided in its movements by means of screws 10, passing through slots 11 in the slide-bar and threaded into lugs 12 extending outward from the ways 5. The slide-bar 9 is provided near its center with a vertical slot 13, with which engages a pin 14 on one arm of a bell-crank lever 15, pivoted at 16 on the back of the frame. The other arm of the bell-crank lever has pivoted to it one end of a link 17, the other end of which is pivoted to the cross-bar 6 of the cross-head 4 near one end thereof. The hub or central portion of the bell-crank lever 15 is provided with a gear-segment 18, which meshes with a similar gear-segment 19 on the hub of a lever 20, pivoted on the frame at 21. To the free end of the lever 20 there is pivotally connected one end of a link 22, the other end of which is pivotally connected to the cross-bar 6 of the cross-head 4 near the other end thereof. By reason of this construction, a firm and even lift is imparted to the cross-head by the application of power thereto at points near its guided edges, thus avoiding danger of binding or sticking of the cross-head in its ways.

Upon the front of the upright portion of the frame there is mounted a shaft 23, supported from the frame member 2 in bearing-brackets 24. This shaft, for convenience sake, may be termed the main setting shaft, since by its means the register is so set as to connect any desired specific fare printing counter or group of printing counters with the actuating mechanism. Said shaft may be connected with a suitable operating mechanism whereby it may be rotated in either direction, such mechanism being preferably of the character set forth in my prior Letters Patent last above referred to. In the present case, however, it is shown in Fig. 5 as provided with an operating head 23ª, by which it may be directly grasped and turned, for convenience in demonstrating. Provision is made for limiting the movement of rotation of the shaft to one revolution or less, preferably by means of the structure shown in detail in Fig. 3, which consists of an arm 25, secured to the shaft 23 adjacent to one of the brackets 24, said bracket having a projection pin 26 which lies in the path of said arm and acts as a stop to limit its motion, the two extreme positions of said arm being shown in Fig. 13 in full and dotted lines respectively. I prefer to provide said arm with a pin or screw 27, which contacts with the pin 26 when the arm is in its initial position, to which it is most frequently returned, said pin or screw serving to receive and take up wear and to adjust the initial position of the shaft.

In order to facilitate the stoppage of the shaft in each of its predetermined positions and hold the same in adjusted position against accidental displacement, I provide a detent mechanism, preferably located at the opposite end of the shaft from the stop mechanism, said detent mechanism being shown in detail in Fig. 16 of the drawings. It comprises a toothed detent wheel 28, secured on the shaft 23 and having coöperating with it a detent lever 29, provided with a tooth 30 to fit between the teeth of the detent wheel, with which a spring 31 maintains it in engagement. The teeth are equally inclined to the radius on both sides, so as to permit movement of the shaft in either direction when sufficient force is applied thereto.

Upon the shaft 23 there is mounted a series of setting cams, of which any desired number may be employed. In the present instance, I have shown 14 of these cams, each one of which is devoted to one specific kind of fare, said cams being indicated by the reference letters from A to N, both inclusive. Each cam has a cam-surface composed of two parts, one of which, comprising the greater portion of a circle, is concentric with the axis of the shaft, and serves to maintain the operating mechanism which it controls in inoperative position, while the other portion, of comparatively slight extent, is eccentric to the axis of the shaft, and serves to move the operating parts into operative position. The cams are so mounted on said shaft that the eccentric part of each cam is arranged at a slight angular advance over that of the preceding cam, counting, for the sake of illustration, from the left of the machine, the angular distance between the successive cams corresponding to the angular distance between the teeth of the detent wheel 28. In the present instance, I have shown each cam as comprising a disk-like body 32, secured to the shaft 23 and having formed in one of its lateral faces a groove 33, which is concentric with the shaft 23 except at one point 34, where said groove is deflected inward. The relative positions of the eccentric portions of the several cams are illustrated in the perspective view, Fig. 9, in which a portion of the total number of cams is shown as though removed from the shaft, slightly separated, and partly broken away, although retaining their correct angular relations. Each of said cams has coöperating with it a lever 35, said levers being loosely hung upon a common shaft 36, supported from brackets 37 on the frame member 2 above the shaft 23. Each lever 35 is provided with a pin 38, which engages the cam groove 33 of the corresponding cam, said pin being preferably provided with an anti-friction roller 39 mounted thereon and traveling in the groove. By reason of this construction, as the shaft 23 is rotated, each lever 35 is successively swung toward the rear of the machine and then forward again into normal position, these two positions being indicated in full and dotted lines in Fig. 10. Coöperating with each lever 35 is a connector 40, the position whereof is controlled by said lever and its cam, in so far as concerns its engagement with and disengagement from the slot 8 in the bar 7 of the cross-head 4. To this end, each lever 35 is provided at its lower end with a screw or pin 41, by which it is pivotally connected with the connector 40, the connection being effected by means of a slot 42 in the upper end of the body of the connector. The connector 40 is also pivotally supported at its lower end upon a pivot 43, between guiding jaws 44 carried by a bracket casting 45. For convenience in construction, it will be seen, from an inspection of Fig. 8, that the pivots 43 of several adjacent connectors may be formed in a single piece. The lower end of each connector is provided with a slot 46 to receive the pivot 43, and by reason of the slots 42 and 46, each connector is capable of vertical motion independently of the lever 35. Each connector is provided at its upper end with a rearwardly extending arm or finger 47, which extends to and may be projected through a slot 48 in the back or rear member 2 of the frame. The arrangement of the parts is such that, when the cross-head 4 is in its normal or lowered position, each connector, when moved rearwardly by its cam and lever, has its rear end projected into the slot 8 in the cross-bar 7 of the cross-head 4. Since only one of these connectors can be moved into this engagement at a time, it will be seen that the setting shaft may be utilized to engage any desired connector with the cross-head, to the exclusion of all the others. When thus engaged, the said connector partakes of the vertical movement of the cross-head, and, by a suitable connection, operates the corresponding counter. This connection is preferably effected by means of a second arm 49, extending forward from the body of the connector, and provided with a slot 50. Each printing counter is provided with an operating pawl-yoke 51, and said yoke is in turn provided with a pin 52, which engages with the slot 50 of the corresponding arm 49, imparting to said yoke an oscillating movement which adds one on the counter controlled thereby.

As will be seen from an inspection of Fig. 6, which shows a front elevation of the lower portion of the machine with the printing mechanism removed, the printing counters are arranged in two parallel rows, as in my prior Letters Patent No. 764,494, hereinbefore referred to. In the present instance, the upper row of printing wheels and counters is under the control of the conductor only, by the provisions hereinafter set forth, and is so arranged as to compile a record of all of the fares of each specific class received between two stations, said record being preferably taken at or immediately before reaching each station, and giving the name of the preceding station, the number of fares of each specific class received at and coming from the preceding station, the total number of passengers from whom fare has been received during that period, and the conductor's number or identifying mark. To this end, said row of printing wheels comprises a plurality of printing counters corresponding to the setting cams and indicated by the prime reference letters from A' to N', inclusive. In the present instance, the machine is so organized that the first printing counter to the left of Fig. 6 is employed to count and make a record of tickets received, including ordinary or slip tickets, transfers, and coupons or book tickets, being indicated by the reference letter A'. The remaining counters of this series, from B' to N' inclusive, are employed to respectively count and record the cash fares from five cents to sixty-five cents, by five cent intervals. Of course, these counters could be employed to record any desired fares, and their number may also be varied as desired. The printing wheel at the extreme left of the upper row, indicated by the reference letter O, is a station printing wheel to which reference will be hereinafter made. The printing counter to the immediate right of the counter N', designated by the reference letter T, is a printing counter which makes a record of the total number of passengers, or, what amounts to the same thing, the total number of fares of all kinds received, between the two stations to which the record refers. The group of printing wheels to the extreme right of the upper row, designated by the reference letter Q, is an identifying device which makes a record of the number of the conductor by whom the station record is made, and will be also hereinafter more fully referred to in detail. All of these printing wheels, except Q, are mounted on a common shaft 53, with which they are so connected, by means well known in the art, that rotation of said shaft in the proper direction will set all of said printing counters to zero, this operation being performed by the conductor at each station after taking a record from said counters.

It will be seen from the foregoing description that, prior to actuating the registering mechanism, the setting shaft and its cams may be moved by the conductor in a position such as to connect any one of the printing counters from A' to N', inclusive, with said actuating mechanism, to the exclusion of all of the others of the series, so that when the conductor has turned said setting shaft to the position corresponding to the particular kind of fare which he has received and is to register, he may then operate the actuating mechanism, whereupon the particular printing counter appropriated to that particular class of fare will be so actuated as to add one thereon.

As a simple and efficient means for indicating to the conductor and passenger the fact that the machine has been set to register, and has registered, the proper fare, I have provided a fare indicating device, consisting of a wheel or disk 54, mounted upon a shaft 55, supported in a bracket 56, which is in turn supported from the frame. As will be seen from an examination of Fig. 1, this disk carries upon its marginal portion indicating letters and figures corresponding to the different kinds of fares, arranged in succession in spaces which are successively brought into registry with a suitable sight opening in the casing. This disk is provided upon its rear surface with a bevel gear 55ª, which meshes with a bevel gear 56ª which rotates in unison with the shaft 23. For convenience and compactness, said gear 56ª may be formed on or secured to one of the setting cams, and, in the present instance, the setting cam E is chosen for this purpose. The parts are so arranged and proportioned that the indicating disk will always show at the sight opening the particular fare of which the setting shaft has moved the printing counter into operative connection with the actuating mechanism of the register.

Referring again to the two rows of counters shown in Fig. 6, and considering the lower row of counters, the first counter to the left, indicated by the reference letter R, is a trip-number printing counter, to which reference will be hereinafter made. The next counter, indicated by the reference letter S, is a daily totalizing counter which is actuated every time the fare printing counter A' of the upper row, relating to fares other than cash fares, is operated, or, in other words, it gives, in the present instance, the daily total of all "paper" fares, being tickets, transfers and coupons. The next counter, indicated by the reference letter T, is a daily total cash printing counter, and gives a record of the total amount of cash received during the day for all kinds of cash fares. The next counter, indicated by the reference letter U, gives a record of the total number of passengers from whom fare has been received during the day, or, in other words, the total number of fares of all kinds received. These four counters, which give daily totals or data, are mounted upon a common shaft 57, by the rotation of which in a proper direction they are all simultaneously set to zero. The next counter, indicated by the reference letter V, is a trip total cash printing counter, giving the total amount of cash received for all kinds of cash fares upon a given trip between all stations. The next counter, indicated by the reference letter W, is a trip total passenger printing counter, giving a record of the total number of passengers from whom fare has been received, or the total number of fares received, during a given trip. These two counters, which give trip totals, are mounted upon a common shaft 58, by the turning of which in the proper direction they are both simultaneously reset to zero. The next printing counter, indicated by the reference letter X, is a grand total passenger printing counter, registering the total number of all passengers whose fares have been registered by the machine, and is not reset, its indications continuing until its capacity is exhausted, when it begins again at zero, although it may, of course, be reset to zero by hand at any time, if desired. The next counter, indicated by the reference letter Y, is intended to be used to make a record of city passengers, from whom city fares are collected on interurban railways, and may be operated by a separate operating mechanism independently of the operating mechanism already described. The next printing counter, indicated by the reference letter Z, is a car number printing counter, composed of printing wheels bearing numbers, which may be set by hand so as to print on the record the number of the car in which the register is mounted. The group of printing wheels to the extreme right on the shaft 58, designated as a whole by the reference letter O', are date printing wheels, to which further reference will be hereinafter made, while the group of number printing wheels, designated by the reference letter P', lying immediately below the group designated by the reference letter O', constitute the cashier's or inspector's identifying means, which will be also hereinafter more particularly described.

I will now proceed to describe the manner in which the several counters of the second or lower group are actuated, and will first consider the daily total ticket printing counter S. This counter is controlled by the cam A, in the manner shown more particularly in Fig. 17 of the drawings. The connector 40 which is controlled from said cam by the lever 35, has, in addition to the arm 47 which engages the cross-head, and the arm 49 which operates the pawl-yoke of the printing counter A, an additional arm 59, extending forward from its lower end and provided with a slot 60, with which engages a pin 61 on the pawl-yoke 62 of the printing counter S. Thus, each time the station total printing counter A' is operated, the daily total ticket printing counter S is also operated, and since the former is set at each station, while the latter is only reset at the end of the day, as hereinafter described, it will give the total of all tickets received during the day.

The daily total passenger printing counter U, the trip total passenger printing counter W, and the grand total passenger printing counter X in the lower row of printing counters, as well as the station total passenger printing counter P' in the upper row, are each operated each time the register is actuated to register a fare of any kind, and, consequently, I connect each one of the said four printing counters to the actuating cross-head in such a way as to be in permanent operative connection therewith. The connection of the trip total passenger printing counter W is shown in detail in Fig. 14 of the drawings, and since all of the connections are similar, a detailed description of this connection will sufficiently explain them all. A slide 63 is provided at its upper end with a finger 64, which extends through the slot 48, and also through the slot 8 in the cross-bar 7 of the cross-head 4, with which latter slot it remains in permanent engagement. I prefer to extend the finger 64 to the rear of the cross-head and to pass a securing pin 65 through its projecting end to maintain the connection of the parts. The slide 63 extends down between one of the pairs of jaws 44 of the bracket casting 45, and is slotted at its lower end, as shown at 66, to receive the pivot pin 43, which serves as a guide for the slide. Said slide 63 is provided with a forwardly extending arm 67, having a slot 68 therein which engages with a pin 69 on the pawl-yoke 7 of the printing counter W, so that each time the cross-head is moved to register a fare, one will be added to the printing counter W. A similar slide 71 operates the daily total passenger printing counter U, while the grand total passenger printing counter X is operated by a similar slide 72. A similar slide 73 operates the station total passenger printing counter P'. These slides, in so far as their relation to the other counter actuating mechanisms is concerned, are shown more particularly in Fig. 7 of the drawings.

The two total cash printing counters T and V are provided with a variable operating mechanism which is operated from the unvarying movement or travel of the cross-head 4, and this variable operating mechanism is controlled from the main setting shaft 23, and so set thereby that when the said setting shaft is moved into position to indicate any one of the specific cash fares within the range of the register, the actuating movement of the cross-head will so actuate the total cash printing counters as to add thereon the amount in cash for which the register is set. This mechanism I will now proceed to describe. Upon the shaft 23 there is secured a gear 74, with which meshes a rack 75, which slides up and down in guides 75ª secured to the front face of the member 2 of the frame. The lower end of the rack 75 meshes with a gear segment 76, carried by a sleeve 77 mounted loosely on a shaft 78. The sleeve 77 carries a cam 79, the position of which is thus controlled by its connection with the setting shaft 23. Mounted loosely on the shaft 78 is a gear wheel 80, to which rotatory motion is imparted by a slide 81, shown more particularly in Figs. 7 and 17. This slide has a finger 82, which extends through the slot 48 and also through the slot 8 in the cross-bar 7 of the cross-head 4, with which it may be held in permanent operative connection by a pin 83. The slide 81 is guided in the same manner as the slide 63, and the other similar slides previously described, between adjacent jaws 44 on the bracket casing 45, being provided with a slot 84 to receive the pivot pin 43.

The forward edge of the slide 81 is provided with a rack 85, which meshes with the gear 80. Said gear 80 imparts its rotatory motion to a spring-pawl 86, which may be connected thereto in any suitable manner. In the present instance, I have shown for this purpose a disk 87, on which the pawl 86 is mounted, said disk being formed with or secured to the gear 80 so as to move in unison therewith. The pawl 86 has a part, preferably in the form of a pin 88, in the path of which the cam 79 lies. A ratchet wheel 89 is secured on the shaft 78, and is adapted to be engaged by the pawl 86 when such engagement is not prevented by the cam 79. The arrangement of the several parts is such that when the setting shaft 23 is in position to cause the ticket printing counter A' to be actuated, for instance, the cam 79 holds the pawl 86 out of engagement with the ratchet wheel 89 before the actuating movement of the register begins, and maintains it out of such engagement throughout said actuating movement, so that no motion is imparted to the ratchet wheel 89, or to the shaft 78, from which latter shaft the total cash printing counters are actuated. When the setting shaft is set for a five cent cash fare, for instance, then the cam 79 is moved into such a position that the pawl 86 is in engagement with the ratchet wheel 89 before the actuating movement of the register begins, to impart a partial movement of rotation to the ratchet wheel 89 and shaft 78. This partial movement of rotation is sufficient to cause said shaft 78, through the gear trains hereinafter described, to actuate the total cash printing counters T and V to an extent sufficient to add five cents thereon. This partial movement of rotation is limited by the cam 79, which, at the proper time, is engaged by the pin 88, said cam thereby lifting the pawl 86 out of engagement with the ratchet wheel, and then maintaining it out of engagement throughout the remainder of the operative movement of the register. When the setting shaft is set for any other cash fare, the cam 79 is moved into a corresponding position, and permits the pawl 86 to remain in engagement with the ratchet wheel 89 long enough to give to the shaft 78 a rotatory movement just sufficient to correspondingly advance the total cash printing counters and to add thereon the amount of cash for which the register is set. The operation of the cam 79 and its associated parts will be more readily understood from an examination of Figs. 17, 18 and 19, in the first of which the parts are shown in the position which they assume when the setting shaft is set to indicate a ticket fare, and before the beginning of the actuating movement of the register. In Fig. 18, the parts are shown in the position which they will assume when the setting shaft is set to register a cash fare, the parts being again in the position which they occupy before the beginning of the actuating movement of the register. Fig. 19 shows the cam set for the same cash fare as in Fig. 18, the actuating movement of the register having taken place, however, to an extent sufficient to cause the cam to lift and hold the pawl out of engagement with the ratchet wheel.

The gearing which connects the shaft 78 with each of the total cash printing counters is shown more particularly in Figs. 7, 8 and 20, and is as follows. For each of said counters there is secured on the shaft 78 an arm 90, which carries a spring pawl 91. Adjacent to each arm 90 there is mounted loosely upon the shaft 78 a large gear wheel 92, which has secured to it, on the face thereof adjacent to the arm 90, a ratchet wheel 93, with which the pawl 91 engages. By reason of this construction, the forward or registering movement of rotation of the shaft 78 is communicated to the gear 92, and from said gear, through an idle pinion 94, to the gear 95 which actuates the total cash printing counter. These printing counters are adding counters of a well known style, and their construction, and the relation of the gears 92 and 95, are such that the amount or extent of forward rotatory motion of the shaft 78, imparted to it through the mechanism already described, will correspondingly advance the number printing wheels of the total cash printing counter, in a way well known in the art, so as to add thereon the amount in cash corresponding to the extent of motion of the shaft 78, which extent is controlled, as already described, by the position of the setting shaft 23 through the cam 79. The pawl and ratchet interposed in the gear train between the shaft 78 and each cash printing counter permits each of said counters to be independently reset to zero without affecting the other cash counter or the shaft 78, since this resetting takes place by means of a rotation of the shafts on which the printing wheels are mounted in a direction the reverse of that in which the printing wheels move during the operation of the counter as an adding counter.

In addition to the various printing counters from which records of the number of fares paid in each specific class of fare, records of the totals of cash and tickets received, and records of the total number of passengers may be made in the manner already described, and in addition to means for indicating the character for each fare as it is paid, I also provide means for indicating to the conductor, passengers and others the total number of passengers carried on each trip so far as it has proceeded. To this end, I provide a passenger indicating register which is visible through a suitable opening in the casing, and which indicates in large numerals the number of passengers. This indicator is shown in detail more particularly in Figs. 28 to 31, inclusive, of the drawings. A shaft 96 is mounted in suitable bearing brackets 97 on the front of the upright member 2 of the frame near the top thereof, and on said shaft are mounted loosely a series of indicating wheels, three being shown in the present instance, and indicated respectively by the numerals 98, 99 and 100. These wheels are so connected, by any of the well known devices to that end, that each complete forward rotation of the wheel 98, consisting of ten steps or movements in advance, will impart one-tenth of a rotation to the wheel 99, of which latter wheel a complete rotation will similarly impart one-tenth of a revolution to the wheel 100, each of said wheels bearing on its periphery the numerals from 0 to 9, inclusive. Movement is imparted to the wheel 98 by means of a ten-toothed ratchet wheel 101, connected to said wheel so as to move in unison therewith, and engaged by a spring pawl 102, mounted in a pawl-yoke 103, hung loosely on the shaft 96. Said pawl-yoke is provided with a pin 104, which engages with a slot 105, formed in a forwardly projecting arm 106, carried by a slide 107, mounted on the back of the upright member 2 of the frame, the arm 106 extending forward through a slot 108 in said upright member 2. The slide 107 is connected to the upper cross-bar 6 of the cross-head 4 in any suitable manner so as to move therewith, the means shown consisting of a screw 109. Thus each upward registering movement of the cross-head 4 advances the wheel 98 one step, adding one on the indicator. In order to prevent "overthrow", or excessive movement of the indicator wheels, the following mechanism is provided. A rock-shaft 110 is mounted in bracket-bearings 111 above the indicator wheels, and is provided with two locking dogs 112, having teeth 113 which, when said dogs are depressed, engage notches 114 in the adjacent edges of the peripheries of the indicator wheels. A spring 115, coiled around the shaft 110, secured thereto at one end and to a suitable fixed point at the other end, serves to hold the locking dogs 112 normally out of engagement with the indicator wheels. The shaft 110 has secured on it an arm or projection 116, which lies in the path of a finger or projection 117 on the arm 106. As said arm 106 approaches the limit of its upward motion, the finger 117 engages the projection 116, so actuating the rock-shaft 110 as to throw the locking dogs 112 into engagement with the indicator wheels, arresting their forward movement at the moment when the slide 107 reaches the limit of its upward motion, thus preventing "overthrow". As soon as the slide 107 starts on its return motion, the spring 114 disengages the locking dogs 112, leaving the indicator wheels free to move forward at the next indication.

Resetting of the indicator wheels to zero is accomplished through a rotary motion imparted to the shaft 96 in the manner and at the time hereinafter described. This rotation of said shaft accomplishes the resetting through the following mechanism. An arm 118 is secured on the shaft 96 so as to rotate therewith, and carries a pin 119 which extends across the peripheries of all of the indicating wheels immediately adjacent to their outer faces. Each of said wheels has mounted within its interior a spring controlled dog 120, pivoted eccentrically to the wheel at 121, and so actuated by a spring 122 that its extremity 123 normally projects through an opening 124 in the periphery of the wheel and lies in the path of the pin 119. The projecting extremity of each dog is beveled off on one side, as indicated at 125, so that when the rotation of said wheel brings any one of the dogs into engagement with the pin 119, said dog will recede into the interior of the wheel, as shown in Fig. 31, and the wheel will continue its rotation without affecting the pin or being affected thereby, the dog being again forced out by its spring as soon as it has passed the pin. When, however, the shaft 96 is rotated in the proper direction, the arm 118 will carry the pin 119 around the indicator wheels, and said pin will successively engage the dogs by their radial faces, as shown in Fig. 30, thus "picking up" the indicator wheels, and, in a complete revolution, returning them all to zero, since the dogs are so located that when the arm and pin are turned as far as they will go in the proper direction, all of the indicator wheels will show a zero at the sight opening.

The trip number printing counter R is operated from the indicator resetting shaft 96 in substantially the same manner as in my prior Letters Patent No. 764,494, the intermediate mechanism being partly omitted in most of the figures of the drawings, but being shown separately in detail in Fig. 65. The shaft 96 is provided at one end with a crank arm 126, to which is pivoted the upper end of a link 127, the lower end of which link is pivoted to one end of a lever 128, fulcrumed at 129 on a bracket 130 mounted on the front of the frame member 2. To the other end of the lever 128 there is pivoted the upper end of a link 131, the lower end of which is pivoted to the pawl-yoke 132 of the counter R, so that each revolution of the setting shaft 96 in resetting the indicator wheels will advance the counter R one number.

The resetting of those parts of the machine which are reset by the cashier or inspector at the end of each trip, and the actuating of the trip number printing counter, are effected by means of a shaft 133, mounted in bearing brackets 134, and provided with an operating head 135, or other means whereby it may be readily rotated. This shaft carries a bevel gear 136, which meshes with a similar bevel gear 137 on the end of a shaft 138 which extends upward in an inclined position toward the top of the machine, being supported in bearing-brackets 139. The shaft 138 is provided at its upper end with a bevel gear 140, which meshes with a similar gear 141 on the end of the shaft 96, and by means of this connection the shaft 96 is rotated to reset the indicator wheels 98, 99 and 100 to zero and actuate the trip number printing counter R. The shaft 133 also carries a gear wheel 142, which, through an idle gear 143 mounted in the brackets 134, transmits motion to a gear 144 secured on the shaft 58. As already stated, the trip total cash printing counter V and the trip total passenger printing counter W are so mounted on this shaft 58 as to be reset to zero when said shaft is given a rotation in the proper direction, and said shaft has this rotation imparted to it by the mechanism just described when the shaft 133 is rotated to reset the indicator wheels and operate the trip number printing counter.

The station printing wheel O is operated in connection with the resetting of the specific fare printing counters A' to N', so that when these counters are reset to zero, as they are at each station, by turning the shaft 53 in the proper direction, the station printing wheel will be advanced one step, so as to print the name of the next station on the next record. Provision is also made, in connection with this wheel, to cause it to automatically reverse the direction of its rotation at predetermined intervals, so that when the machine is used on a car traveling over a route from a starting point at one end of a line to the other end of the line and back, the station printing wheel will properly print the names of the stations, first in their primary order, during the travel in one direction, and then in the reverse order, during the return travel in the other direction. These results are obtained by the mechanism illustrated more particularly in Figs. 4 and 5, and in detail in Figs. 22 to 27, which mechanism I will now proceed to describe. The station printing wheel O is mounted loosely on the shaft 53, and has upon its periphery printing characters indicating the names of the several stations in their proper order.

The shaft 53 is adapted to be rotated in the direction shown by the arrows in Fig. 4, by means of a suitable key, which may be applied to the left hand end of the shaft 53 in Figs. 1 and 5, where the shaft is shown as provided with a pin or projection 145 to receive said key. The barrel of the key is indicated in section at 146 in Fig. 22, said barrel having a slot 147 to engage the pin 145. Secured on the shaft 53 near its left hand end is a crank arm 148, provided with an outwardly extending pin 149. 150 indicates a vibrating lever, comprising a central hub or sleeve 151, by means of which it is pivoted on a stud 152. One end of this lever is formed into a cam yoke 153, in which the pin 149 travels, and by contact with the inner wall of which said pin, during each complete rotation of the shaft 53, vibrates the lever 150 from the position shown in full lines in Fig. 22 to the position shown in dotted lines in said figure and then back to its original position, shown in full lines. The opening in said cam yoke is sufficiently large to permit the lever 150 to vibrate in the manner described, and at the same time permit the shaft 53 to be extended through the cam yoke in order to receive the operating key. As shown, the cam yoke has opposite slots 154 and 155, with which the pin 149 successively engages during the downward and upward movements of the cam yoke respectively, and intermediate cam contact surfaces 156, with which said pin contacts during certain portions of its travel. The lever 150 has on the other side of its pivotal axis from the cam yoke a portion 157, which is slotted, as shown at 158, to receive a pin 159, carried by a pawl-supporting arm 160. This pawl-supporting arm is located on the inner side of the support 161 on which the lever 150 is mounted, and is hung loosely upon the shaft 53 at its forward end, as indicated at 162. Upon the inner face of the pawl-supporting arm 160 there is mounted a bearing stud 163, on which is pivotally mounted a pawl 164, which is a double pawl having two engaging arms 165 and 166, and another arm 167, extending in the opposite direction from the pivot stud 163, and having its extremity formed into oppositely inclined or beveled contact surfaces 168 and 169, as shown in Figs. 24 and 27. The pawl-supporting arm 160 also carries a spring detent 170, mounted to slide in a housing 171 on the arm 160 and backed by a spring 172 in said housing. The projecting end of this pin 170, which coöperates with the arm 167 of the pawl 164, has its end also formed into a double incline or bevel, the surfaces of which are indicated by the reference numerals 173 and 174, said detent lying in the path of the end of the arm 167. There is connected to or formed on the hub of the station printing wheel O a ratchet wheel 175, the teeth of which are preferably of equal inclination to the radius, and with these teeth either one of the pawl arms 165 or 166 may be brought into engagement. There is also secured to or formed on the hub of the wheel O a cam disk 176, having a cam projection 177, in the path of which lies an arm 178, connected to the pawl 164 so as to move in unison therewith. The wheel O is also provided with a detent ratchet wheel 179, engaged by a detent pawl 180 controlled by a spring 181, as shown more particularly in Fig. 26. This detent mechanism serves to hold the station printing wheel O in any position to which it may be moved by its actuating mechanism, and to prevent accidental displacement of said wheel. By reason of the mechanism just described, each time the shaft 53 is rotated to reset to zero the printing counters controlled thereby, a complete vibration will be imparted to the lever 150, and from it through the pin 159 to the pawl-supporting arm 160.

Assuming that the parts are in the position shown in Fig. 24, the pawl arm 165 being in engagement with the ratchet wheel 175, the first or downward movement of the pawl-supporting arm will cause the pawl to rotate the ratchet wheel, advancing it one step, and moving the name of the next station into printing position. During the return or upward movement of the pawl-supporting arm, the pawl arm 165 will slip over the teeth of the ratchet wheel 175, the detent 170 yielding sufficiently to permit this, and returning the pawl arm 165 to proper engaging position with the teeth of the ratchet wheel 175, in which position the spring of said detent holds said pawl arm during its operative or downward strokes. The parts are so constructed and arranged that the arm 167 of the pawl does not swing past the central line of the detent during these operations, and the bearing surface 173 of the detent remains in contact with the bearing surface 168 of the arm 167 of the pawl during one complete revolution of the printing wheel O. At the end of the first half of the trip, the conductor having reset the printing counters on the shaft 53 at each station, station printing wheel O will have made one complete revolution, or so much of a revolution as is necessary to print successively the names of all the stations. The cam projection 177 then comes into contact with the arm 178, and rocks said arm and the pawl 164 upon their common pivot to an extent such as to cause the arm 167 of said pawl to pass the center line of the detent 170, bringing the surface 174 of said detent into contact with the surface 169 of the arm 167, and throwing the pawl arm 166 into engagement with the ratchet wheel 175, at the same time throwing the pawl arm 165 out of engagement with said wheel. The further vibrations of the lever 150 and pawl-supporting arm 160 will cause the ratchet wheel 175 and station printing wheel O to rotate in a direction opposite to that in which they rotated during the first half of the trip, so that the station names will be printed in the reverse order during the return portion of the trip. Of course, it will be understood that this reversing mechanism may be dispensed with where the register is used in connection with a route over which the travel is not reversed, as on a belt or circuit line.

The conductor's identifying device Q, which is alined with the other printing wheels of the upper row of printing counters, is set forth in detail and claimed *per se* in an application filed by me August 10, 1904, Ser. No. 220,183. This identifying device is shown in detail in Figs. 44 to 55 of the drawings, inclusive, and comprises, in the present instance, three printing wheels, 185, 186 and 187, mounted in a support 188 and constituting the hundreds, tens and units wheels respectively, since the identifying characters chosen for purposes of illustration are numerals, which are preferred. In this construction, each wheel has upon its periphery a series of printing characters running from 0 to 9, or ten in all. These printing wheels are suitably supported so as to be capable of rotating around an axis in line with the shaft 53, and are so arranged that any of the printing characters thereon may be brought into printing position in alinement with the printing characters of the printing counters mounted on said shaft 53. For this purpose I employ a shaft 189, mounted in the frame or support 188 so as to rotate therein, and having mounted on it the said printing wheels 185, 186 and 187. Each printing wheel is provided with a central opening 190 to receive the shaft 189, and each of said printing wheels, except the one farthest from the end at which the key is inserted, is provided with a slot 191 of a size sufficient to permit the free passage of the key. The shaft 189 also serves as a barrel or hub to receive the key, and to that end is provided with a longitudinal slot or recess 192, forming a way or guide for the key, 193. Said key has a flat body to fit the recess 192, which body is of a width such as to project outward beyond said recess and beyond the barrel or hub 189. When the printing wheels are so turned that their slots 191 are in alinement with the slot or recess 192, and with each other, and also with a slot 194 formed in the support 188, then the key may be inserted into the barrel and through the printing wheels, as shown in Fig. 54.

The key is provided with a suitable head 195, and with a stop shoulder 196, which, by its contact with the end of the barrel 189, limits the inward movement of the key. The key is further provided with a notch or cutaway portion 197, of a width sufficient to receive the portion of the support 188 through which it is inserted and thus permit the key to turn when fully inserted, while preventing its turning when not thus fully inserted. In addition to this notch 191 the key is provided with selective projections, corresponding in number to the printing wheels, three being shown in the present instance, and indicated by the reference numerals 198, 199 and 200. These projections are of different lengths for different identifying characters, and, in the present instance, the number 345 has been chosen as the identifying character for the particular key illustrated, the projection 198 being adapted to turn the printing wheel 185 so as to present the numeral 3 in printing position, while the projections 199 and 200 are respectively adapted to so turn the printing wheels 186 and 187 as to present the numerals 4 and 5 in printing position. To accomplish this, each printing wheel is provided with a series of selective projections or stop shoulders, arranged at successively increasing distances from the wheel center, the key projections working in the spaces between the printing wheels and turning until they engage with the particular stop shoulder with which they are designed to coöperate. In the form of construction shown in Figs. 44 to 54 inclusive, each printing wheel is provided in one face with a recess 201, the peripheral wall of which has a series of stop shoulders 202, arranged as above described, and adapted to be engaged by the movement of the key in one direction, said wall being also provided with a stop shoulder 203, adapted to be engaged by the key when moving in the opposite direction. As a simple and effective means for facilitating the construction of these parts, I prefer to have each printing wheel in two parts, the one consisting of the body of the wheel, carrying the printing characters, said body being recessed at one side, as indicated at 204, to form a seat to receive the other part, consisting of a supplemental member 205, which is suitably secured to said body in said seat, and which has the recess 201 formed in it by cutting entirely through said supplemental member 205, whereby said recess may be readily formed before the parts are assembled. Suitable detent devices are employed to hold the printing wheels in the position to which they may be moved, and, as a simple and efficient means for effecting this result, I prefer to make the member 205 project laterally beyond the body of the wheel, and provide the periphery of said member 205 with a number of notches 206, corresponding to the number of stop shoulders and printing characters of the wheel. Detent pawls 207 are employed, one for each printing wheel, and held in engagement with the notches 206 thereof by springs 208. The rotation of the key is limited by means of a stop 209, formed on the outer face of the support 188 immediately adjacent to the slot 194 therein, said stop having upper and lower contact surfaces 210 and 211, with which the body of the key respectively comes into contact to limit its motion of rotation in each direction.

The structure thus organized is normally in such a position that the printing characters 0 of all the printing wheels are in printing position, and the slots 191 of the several printing wheels which are provided with such a slot are in line with the key slot 194 of the support 188. When the parts are in this position, the key may be inserted through a suitable opening in the outer casing and may be slid along the groove or key way 192 in the barrel or shaft 189 until the shoulder 196 of the key comes into contact with the outer end of the barrel. When the key has been thus far inserted, the projection 198 of the key lies in the recess of the printing wheel 185, and the projections 199 and 200 lie in corresponding recesses of the printing wheels 186 and 187. The notch 197 of the key then registers with the frame 188 in such a way as to permit the key to be turned, and this is the only position in which the key can be turned, since the spaces between the projections 198, 199 and 200 are of less width than the frame member 188. The key is then turned away from the stop 209, the barrel or shaft 189 turning with it, and the printing wheels remaining stationary until the longest projection of the key engages with the corresponding stop shoulder of the corresponding printing wheel. In the present instance, the projection 200 will first engage with the fifth stop shoulder of the printing wheel 187, being the stop shoulder corresponding to the printing character 5 and being the fifth in order beginning with the stop shoulder nearest the wheel center. Said printing wheel 187 will then begin to rotate, and will continue its rotation throughout the remaining setting movement or rotation of the key. The projection 199 next engages with the fourth stop shoulder of the printing wheel 186, and the projection 198 finally engages with the third stop shoulder of the printing wheel 185. The key, barrel and printing wheels then continue to turn until the key comes into contact with the lower stop surface 211 of the stop 209, whereupon the printing characters 3, 4 and 5 will be in printing position. Any record taken from the printing counters on the shaft 53 will have impressed upon it the numeral 345, and will show that the person taking the record was the person provided with the corresponding key. The key is locked in position in the device against longitudinal movement by the engagement of the notch 197 with the support member 188, and can only be removed by turning the key backward until it comes into contact with the upper stop surface 210 of the stop 209, in which position it is in alinement with the key slot 194 of the support 188. During this return movement of the key, its projections successively come into contact with the stop shoulders or terminal walls 203 of the several printing wheels, thereby bringing them all back to their original position, with the characters 0 in printing position, and with the slots 191 in alinement with the slot 194, thus permitting the removal of the key, which can only be removed when the printing characters are in this original position and can only be inserted when the parts are in such position.

It will be seen that by varying the length of the projections on the key, or employing keys having projections of different lengths, the several printing wheels may be set to print any desired combination of the characters which they bear when the key has been inserted and turned as far as it will go. It will also be seen that the printing wheels of the identifier form a permanent part of the register, in which they may be so mounted as to be firmly supported and accurately alined with the coöperating printing counters, so as to insure a perfect impression of the identifying characters. It will also be seen that these printing wheels are adapted to be operated by any key constructed in accordance with the system, always responding to the particular key used by moving the corresponding printing characters into printing position. In Fig. 44 the key is shown as having stamped upon its head the number which the device will print when said key is used, but this is not essential, since one of the advantages of this feature of my invention is that where the number or character is not thus indicated on the key, there is nothing about the key to indicate what identifying characters said key will produce. It follows from this that the operator may be kept in entire ignorance of the identifying character which he produces upon the record, which is frequently desirable as a means for preventing fraud. Where the operator's key bears upon itself the identifying character, it is, of course, impossible to prevent the operator from knowing what that character is. In practice, it is possible to stamp or mark upon the keys numbers or other characters by which they may be kept track of, while the identifying characters which said keys produce may be entirely different, but perfectly distinctive. It will be understood, of course, that the characters upon the printing wheels need not be numerals, that any desired number may be employed upon each wheel, and that any desired number of wheels within practical limits may be used.

The cashier's identifying group of printing wheels P', shown in detail in Figs. 56 to 64, together with their shaft or barrel, indicated by the reference numeral 212, and key, indicated by the reference numeral 213, are in the main identical with the conductor's identifying device just described, and require no detailed description beyond the statement that in their case I have shown the supplemental member of each printing wheel as secured to the lateral face of said wheel instead of being seated in a recess in said lateral face.

In connection with the fare printing wheels as hereinbefore referred to I employ a printing mechanism whereby a sheet or strip of paper may be properly fed forward from a roll, and on which an impression may be taken from one or the other of the rows of printing counters under conditions hereinafter set forth. This printing mechanism is practically identical with the printing mechanism set forth in my prior Letters Patent No. 764,494, and needs no detailed description here, it being sufficient to call attention to the fact that it is so arranged as to operate in a vertical plane, instead of in a horizontal plane as in said prior patent, the impression face in the present machine being vertical, owing to the fact that the two rows of counters are located the one above the other, this giving increased compactness. This printing mechanism, together with the setting mechanism and the actuating mechanism of the register, are normally locked against movement. All three mechanisms are locked when the conductor inserts and turns his key, becoming again locked when said key is removed.

The printing mechanism is unlocked when the cashier's or inspector's key is inserted and turned, the settled and actuating mechanism remaining locked. The insertion and turning of said keys also controls the operation of the printing mechanism in such a way that when the conductor's key is inserted and turned, an impression can be taken only from the upper row of printing wheels, while when the cashier's key is inserted and turned, an impression can be taken only from the lower row of printing wheels. The mechanism whereby these results are accomplished will next be described, considering first those controlled by the conductor's key, which are shown more particularly in Figs. 32 to 37, inclusive. On the shaft or barrel 189 which coöperates with the conductor's key there is secured a cam 214, having a periphery of gradually increasing diameter, provided with a detent notch 215 near its part of maximum eccentricity. With this cam coöperates a lever 216, pivoted on a suitable support at 217 and provided with a part which bears against the periphery of the cam 214, against which it is held by a spring 218. This bearing part preferably consists of a grooved antifriction roller 219, shown in detail in Fig. 37, and mounted on a pin or pivot stud 220 on the lever 216, on one side of the pivot 217. On the other side of said pivot 217 there is connected to the lever 216 the lower end of a link 221, the upper end of which is pivotally connected to a locking lever 222, pivoted between its ends at 223 on a bracket 224 mounted on the frame member 2. The setting shaft 23 is provided with a toothed wheel 225 secured thereon, over which that portion of the locking lever 222 lying in front of the pivot 223 extends, the same being provided with a locking tooth 226, which is adapted, when the front end of said locking lever is depressed, to engage between the teeth of the wheel 225 and lock the setting shaft against rotation. That portion of the lever 222 extending rearward from the pivot 223 passes under the actuating slide bar 9, which slide bar is provided with a notch or recess 227, with which said lever engages when its front portion is depressed and its rear end elevated, such engagement locking the slide bar 9, and, consequently, the actuating mechanism, against movement. The lever 216 is provided near its front end with a projection 228, in the path of which lies a finger 229, secured to a vertical rod 230 which is pivoted at its upper end to one end of a locking lever 231, which controls the printing mechanism. To this end the primary operating shaft 232 of the printing mechanism, on which the operating handle 233 is mounted, has secured on it a collar 234, having a notch or recess 235 with which the toothed end 236 of the locking lever 231 is adapted to engage in the manner shown in Fig. 3. The pivot 237 of said locking lever is located between the toothed end 236 and the end to which the rod 230 is connected. When the conductor's key is withdrawn, the parts are in the position shown in Fig. 3, the locking lever 222 being in engagement with the wheel 225 on the setting shaft 23, and also in engagement with the slide bar 9, so that neither the setting shaft nor actuating mechanism can be operated, while the locking lever 231 is in engagement with the notch 235 of the collar 234 on the printing shaft, so that the printing mechanism can not be operated. When the conductor inserts his key and turns the same, so as to bring the printing wheels of his identifying device into proper printing position, he at the same time turns the cam 214 to the position shown in Fig. 32, in which position of the parts the two locking levers 222 and 231 are so moved through the intermediate lever 216 as to unlock the setting and actuating mechanisms and the printing mechanism. When the conductor removes his key, he turns the cam 214 back to the position shown in Fig. 3, thereby locking the setting and actuating mechanisms through the action of the spring 218. The printing mechanism is locked through the action of a spring 238, which bears against the under side of the finger 229 and moves the rod 230 upward as the pin 228 moves upward.

The shaft or barrel 212 which coöperates with the cashier's key has secured thereon a cam 239, of a gradually increasing radius, said cam having near its point of maximum eccentricity a detent notch 240, and a similar notch 241 at its point of minimum eccentricity. With this cam there coöperates a lever 242, pivoted at 243, and having a part 244 which bears upon the periphery of the cam 239, with which it is held in contact by a spring 245. The part 244 is preferably a grooved roller, like the grooved roller 219, mounted on a pivot pin or stud 246. The resetting shaft 133 by which the parts are reset at the end of the trip has secured on it a collar 247, provided with a notch 248, and the lever 242 has a tooth 249 which is adapted to engage with said notch and lock the trip resetting mechanism. The lever 242 is also provided with a pin or projection 250, which engages with a slot 251, shown in dotted lines in Fig. 38, in an arm 252 projecting from a collar 253 secured on a vertical sliding rod 254. This rod slides through guiding brackets 255 and preferably serves as a support for the springs 238 and 245, which are coiled around it, the spring 245 bearing at its ends against the lower bracket 255 and the collar 253, while the spring 238 bears at its lower end against the collar 253, its upper end bearing against the finger 229, which is apertured for the passage of the rod 254, on which it is free to slide. Above the finger 229 there is secured on the rod 254 a block 256, which, when the rod 254 is depressed, bears upon the finger 229, and lifts the locking lever 231 out of engagement with the collar 234 through the medium of the rod 230. The normal position of these parts is that shown in Fig. 3, with the lever 242 in engagement with the collar 247, thereby locking the trip resetting mechanism against movement, and with the locking lever 231 in engagement with the collar 234, thereby locking the printing mechanism against movement. When the cashier or inspector inserts his key in the barrel 212 and turns the same, the parts are moved into the position shown in Fig. 38, the cam 239 actuating the lever 242 so as to disengage it from the locking collar of the trip resetting mechanism so as to permit the cashier to operate the same. At the same time, the lever 242, through its engagement with the arm of the collar 253, moves the rod 254 downward, whereupon the block 256 engages the finger 229, and, through the rod 230, lifts the locking lever 231 out of engagement with the collar 234, permitting the cashier to operate the printing mechanism. Of course, when the cashier inserts and turns his key to effect these results, he at the same time turns the printing wheels of his identifying device in a position to print as a part of the record his identifying number. Upon the removal of the cashier's key, the trip resetting mechanism and printing mechanism again become locked, the former remaining locked when the conductor's key is in use.

The conductor's and cashier's keys also control the field of operation of the printing mechanism, by means of stop pins 257 and 258, which correspond respectively to the stop pins 212 and 213 of my prior Letters Patent No. 764,494, the construction of the printing mechanism being, as set forth in said prior Letters Patent, such that when the pin 257 is projected into the path of the printing carriage, an impression can be taken from the upper row of counters only, and when the pin 258 is projected into the path of said carriage, an impression can be taken from the lower row of printing counters only. These pins are connected, as in said prior Letters Patent, by a lever 259, pivoted on a central support 260 and pivotally connected to the pins at its opposite ends. In order to control the position of these pins by means of the respective keys, the following construction is employed. The lever 216 is provided at its forward end with an inclined or cam surface 261, in the path of which the outer end of the pin 257 lies. When the lever 216 is moved down into the operative position shown in Fig. 32, this cam surface contacts with the pin 257, in the manner shown in Fig. 42, and projects said pin into the path of the printing carriage, as shown in said figure. The block 256 is provided with an inclined or cam surface 262, which, when said block is moved downward by the operation of the cashier's key in the manner already described, comes into contact with the outer end of the pin 258, in the manner shown in Fig. 41, and forces said pin 258 into the path of the printing carriage. By reason of this construction, when the conductor's key is in operative position a record can be printed only from the upper row of printing wheels, and when the cashier's key is in operative position a record can be printed only from the lower row of printing wheels.

It will be understood that the detent recesses 215, 240 and 241 in the cams 214 and 239 serve merely to hold the parts of the locking mechanism in whatever position they may be moved to, preventing accidental displacement thereof. It will also be understood that, with the particular arrangement of the springs 238 and 245 hereinbefore described and shown in the drawings, the spring 245 aids in returning the locking lever 231 to locking position after it has been disengaged by means of the cashier's key.

It will be noted that the identifying mechanisms are operated by means of a key which is given practically a complete rotation, from which movement of rotation the power to operate the locking mechanisms is derived. In my prior Letters Patent No. 764,494, the operative movement of the key is a sliding or longitudinal movement, and the resulting movement imparted to the locking mechanisms is necessarily slight in range, requiring a more delicate and less positive locking movement. The rotating movement of the identifying keys, in my present construction, gives a much wider range of initial movement and a corresponding increase in the power and positiveness with which the locking mechanisms are actuated.

The date printing wheels, constituting the group O', are controlled in the usual way, and comprise a wheel 263, having on its periphery the names of the months or abbreviations thereof, said wheel being secured on a shaft 264 provided at its outer end with the hand wheel 265, which also serves as an index wheel to indicate the position of the wheel 263. The wheel 266 has numerals on its periphery, and is mounted on a sleeve 267 having an operating and index wheel 268 on its outer end. The wheel 269 also has numerals on its periphery, and is mounted on a sleeve 270, provided on its outer end with an operating and index wheel 271. The sleeve 267 is mounted on the shaft 264, and the sleeve 270 is mounted on the sleeve 267. By means of the operating wheels, the printing wheels of the date printing group may be moved to print any desired date.

The machine may be provided with any suitable alarm or signal to attract the attention of the passengers when the fare is registered. The construction I prefer for this purpose is that shown, in which a bell 272 is mounted on the back of the member 2 at the top thereof, and is adapted to be operated by a striker 273, carried by a resilient arm 274, extending upward from a lever 275, pivoted at 276, and held against a stop 277 by a spring 278. The lever 275 has a projecting finger 279, which lies in the path of a dog 280 which rests on top of the slide 107, said slide being provided with a bracket 281, to which the dog is pivoted at 282. Said dog is beveled or inclined on its upper surface, and during the upward movement of the slide said beveled surface engages the finger 279, and, the dog being held against movement by its contact with the end of the slide, the lever 275 is tilted backward until it clears the dog, when it is forced forward by the spring 278 against the stop 277, and the striker strikes the bell and gives the alarm. During the downward movement of the slide, the dog 280 turns on its pivot so as to pass the finger 279, and then falls back into position again, ready to engage said finger on the next upward movement of the slide.

In connection with the printing wheels and counters and the printing mechanism, I employ a printing plate 283, shown in detail in Figs. 66 to 68. This plate is secured in position in front of the printing counters, and is provided with a row of openings 284, through which the printing counters of the lower row project into printing position. Said plate has thereon printing characters including a general heading, giving the name of the railway and the number of the machine, and also an opening 285, through which the printing wheels of the cashier's identifying device project into printing position. Adjacent to this opening the printing plate has an appropriate legend, such as "Cashier's No." Similarly, said printing plate has immediately below each of the openings 284 a legend designating the character of the record which the corresponding group of printing wheels produces. In addition to this it also has a sub-heading referring to the daily total printing counters S, T and U, which print respectively the daily totals of tickets, cash and passengers. Finally, said printing plate has at its top a row of headings corresponding to the printing wheels and counters of the upper row, and to the conductor's identifying device, indicating the contents of the columns of the several station records.

A specimen of a partial or single trip record produced by the machine is shown in Fig. 69, and the operation of the machine in producing this record will be readily understood from the preceding detailed description of its parts, requiring only a general description. Assume that on the fifth trip of the day from Dayton to Urbana the conductor collects between Dayton and the next station, Double Track, the fares shown in the bottom line of the record. Prior to operating the machine, the conductor inserts and turns his key, thereby unlocking the setting and actuating mechanisms and the printing mechanism. As each fare is collected, he turns the setting mechanism to the proper position, thereby indicating to the passengers the class or amount of the fare about to be registered, and setting the corresponding printing counter into operative connection with the actuating cross-head. If the fare is a cash fare, the cam 79 is at the same time turned into such a position as to add the proper amount of cash upon the cash printing counters. The actuating mechanism is then operated by the conductor, whereupon the proper specific fare counter of the upper row adds one, the passenger indicator also adds one, one is added to the station total, trip total, daily total and grand total passenger indicating counters, and the amount of cash received, if any, is added on the trip total and daily total cash printing counters. At the first station, the conductor operates the printing mechanism, and thereby prints that portion of the record constituting the lower line thereof, giving the name of the station at the beginning of the trip, the number of fares of each specific kind received, the total number of passengers, and his identifying number. He then resets the fare printing counters of the upper row to zero by means of the shaft 53, at the same time, turning the station printing wheel into position for the next station. A record is made at each station in the same way, until the trip is completed at Urbana, whereupon the last of the station records, being the uppermost line thereof below the station headings, is printed by the conductor, who then resets the printing counters to zero, at the same time reversing the direction of travel of the station printing wheels. The conductor thereupon removes his key, thereby locking the setting and actuating mechanisms and the printing mechanism. The cashier then inserts and turns his key, unlocking the trip resetting mechanism and the printing mechanism, and changing the path of the printing mechanism so as to print from the lower row of the printing counters only. He thereupon operates the printing mechanism, taking an impression from the printing plate and lower row of printing counters, thus printing the remainder of the record as it appears in Fig. 69. The cashier then resets the trip printing counters and the passenger indicator, at the same time advancing the trip number printing counter one step. He thereupon removes his key, leaving the machine locked in all parts until the same conductor or another conductor inserts his key and proceeds to make the station records for the return trip in the same way. Each conductor and each cashier identifies himself as the maker of such records as he makes by the use of his key, and the conductor can print only from the upper row of printing counters, while the cashier can print only from the lower row. The conductor cannot operate the trip resetting mechanism, nor can the cashier either set or actuate the machine to register fare. At the end of the day, or at any other predetermined period, the cashier taking the last record duplicates the same, thus giving a final record from the lower printing counters only, which is a record of the daily totals, giving the number of trips, the total number of tickets, the total amount of cash received during the day, and the total number of passengers carried during the day, together with the date, cashier's number and car number. In addition, this daily record also shows the grand total number of all passengers registered on the machine and the trip total numbers of the last trip. The daily total printing counters and the trip number printing counter are then reset to zero by means of the shaft 57, the trip total printing counters having, of course, been previously reset to zero.

It will be seen that the machine, organized in the manner shown and described, accomplishes the several results which I have stated at the beginning of this specification to be the objects of my present invention. The setting and actuating mechanisms set forth greatly increase the capacity of the machine over what is set forth in my prior Letters Patent, in so far as concerns the number of different kinds of specific fares which the machine is adapted to handle, while the machine is at the same time more compact and operates with less frictional resistance, and only a single actuating connection is required to actuate the register. The fare indicating mechanism is greatly simplified. The machine prints separate station, trip and daily total records, giving all of the desired data as to the character and number of fares received in the station records, totalizing the more important data in the trip and daily total records. Suitable provision is made to place the making of these records under the control of the proper parties only, and to positively identify the makers of said records, at the same time restricting the use of the register proper to the conductors, who are responsible for the collection of the fares which it records. The capacity of the cash adding printing counters is increased over that of the machine of my prior Letters Patent, being made variable so that each cash adding printing counter is capable of adding any sum within the increased range of the machine. The name of each station is automatically set to printing position to form a part of the station record taken at that station, and the order of printing of the station names is automatically reversed when the direction of travel is correspondingly reversed.

It is obvious that my invention is not limited in its application to the registering and recording of street car fares, although I have shown it as embodied in a machine of that character, as it will at once be seen that the invention is capable of a much wider application, being adapted for the registering and recording of data of various kinds.

It will also be understood that portions of the machine may be employed without necessarily involving the employment along with them of all of the various features hereinbefore enumerated.

It is also obvious that various modifications may be made in the details of construction without departing from the principle of my invention, and I therefore do not wish to be understood as limiting myself to the precise construction and arrangement of parts hereinbefore described and shown in the accompanying drawings.

Having thus fully described my invention, what I claim as new and desire to secure by Letters Patent is:—

1. In a machine of the character described, an actuator, a plurality of printing counters, an operating mechanism for each counter, comprising a part movable into and out of the path of the actuator, and setting mechanism comprising a shaft having a series of cams thereon, one for each counter, arranged to successively impart to the said movable parts of said operating mechanism said movement when said shaft is rotated, substantially as described.

2. In a machine of the character described, an actuator, a plurality of printing counters, an operating mechanism for each counter, comprising a part movable into and out of the path of the actuator, setting mechanism comprising a shaft having a series of cams thereon, one for each counter, arranged to successively impart to said movable parts said movement as said shaft is rotated, and means for printing a record from said counters, substantially as described.

3. In a machine of the character described, an actuator, a plurality of printing counters, an operating mechanism for each counter, comprising a part movable into and out of engagement with the actuator, and setting mechanism comprising a shaft having a series of cams thereon, one for each counter, arranged to successively so engage and disengage each of said movable parts with the actuator, as said shaft is rotated, substantially as described.

4. In a machine of the character described, an actuator, a plurality of printing counters, an operating mechanism for each counter, comprising a part movable into and out of engagement with the actuator, setting mechanism comprising a shaft having a series of cams thereon, one for each counter, arranged to successively move said movable parts into and out of engagement with the actuator, and means for printing a record from said counters, substantially as described.

5. In a machine of the character described, an actuator consisting of a reciprocating cross-head, a plurality of printing counters arranged in a plane parallel with the plane of reciprocation of the cross-head, a setting mechanism comprising a shaft having thereon a plurality of cams, one for each counter, operating mechanisms for said counters, each comprising a part movable into and out of the path of the cross-head, mechanism between said cams and movable parts whereby rotation of the shaft successively moves said parts into and out of the path of the cross-head, and a printing mechanism for printing a record from said counters, said printing mechanism operating in a plane parallel with the plane of movement of the cross-head, substantially as described.

6. In a machine of the character described, a frame or support comprising an upright member, an actuating cross-head mounted to slide vertically on the rear thereof, counters mounted in one or more horizontal rows on the front thereof, each counter provided with an operating mechanism comprising a part adapted to be moved into and out of operative relation with the cross-head, a setting shaft mounted on the front of said frame member parallel with the counters and provided with a series of cams, one for each counter, and a corresponding plurality of levers pivoted on the front of said frame member, engaging the respective cams and operating mechanisms, and serving to successively move said operating mechanisms into and out of operative relation with the cross-head as said setting shaft is rotated, substantially as described.

7. In a machine of the character described, a frame or support comprising an upright member, an actuating cross-head mounted to slide vertically on the rear thereof, counters mounted in one or more horizontal rows on the front thereof, each counter provided with an operating mechanism comprising a part adapted to be moved into and out of operative relation with the cross-head, a setting shaft mounted on the front of said frame member parallel with the counters and provided with a series of cams, one for each counter, a corresponding plurality of levers pivoted on the front of said frame member, engaging the respective cams and operating mechanisms, and serving to successively move said operating mechanisms into and out of operative relation with the cross-head as said setting shaft is rotated, and a printing mechanism supported from said frame in front of said counters and operating in a vertical plane, substantially as described.

8. In a machine of the character described, a frame or support, a cross-head mounted to slide thereon to actuate the counting mechanism of the machine, a slide-bar mounted to reciprocate on the support transversely to the cross-head, a bell-crank lever pivoted on the support and having one of its arms connected to said slide-bar, said bell-crank lever having a gear segment, a link connecting the other arm of said bell-crank lever to the cross-head near one end thereof, an arm pivoted on the support and having a gear segment meshing with that of the bell-crank lever, and a second link connecting said arm with the cross-head near its other end, substantially as described.

9. In a machine of the character described, a reciprocating cross-head provided with a slot, in combination with a plurality of detail counters, each provided with an operating mechanism having a part adapted to be moved into and out of engagement with said slot, a setting shaft provided with cams and intermediate mechanism for successively effecting such engagement and disengagement of the detail counter operating mechanisms, and a totalizing counter having an operating mechanism comprising a part permanently engaging said slot, substantially as described.

10. In a machine of the character described, a vertically reciprocating cross-head provided with a slot, a plurality of counters having actuating pawl-yokes, a setting shaft having a corresponding plurality of cams thereon, the eccentric portions whereof are successively angularly advanced, a corresponding plurality of levers engaging said cams respectively, and a corresponding plurality of connectors, each provided with an arm to engage the cross-head slot and an arm to engage the corresponding pawl-yoke, each connector being longitudinally slotted at its ends, the corresponding lever being provided with a pin to engage the upper slot of the connector, and a guiding or pivot pin engaging the lower slot of the connector, substantially as described.

11. In a machine of the character described, the combination, with an actuator, and a plurality of adding counters actuated thereby, each of said adding counters being provided with a separate operating mechanism, of a setting shaft having cams whereby said operating mechanisms are successively engaged with and disengaged from the actuator, and an indicator having a geared connection with said setting shaft, whereby said indicator indicates the particular counter which is in operative connection with the actuator, said indicator rotating on an axis at right angles to said shaft, and said shaft and indicator being provided with bevel gears which constitute the geared connection, substantially as described.

12. In a machine of the character described, a group of detail counters comprising one for each specific kind of payment, a second group comprising totalizing counters giving totals derived from the first group, a third group comprising totalizing counters for also giving totals derived from the first group, actuating mechanisms for selectively actuating any one counter of the first group and simultaneously actuating the corresponding counters of the second and third groups, and means for separately resetting to zero each group of counters, substantially as described.

13. In a machine of the character described, a group of detail counters comprising one for each specific kind of payment, a second group comprising totalizing counters giving totals derived from the first group, a third group comprising totalizing counters for also giving totals derived from the first group, actuating mechanisms for selectively actuating any one counter of the first group and simultaneously actuating the corresponding counters of the second and third groups, and means for separately resetting to zero each group of counters, in combination with means for locking against unauthorized operation the resetting mechanism of one of said groups, substantially as described.

14. In a machine of the character described, a group of counters comprising one for each specific kind of fare and constituting a station group, a second group comprising totalizing counters giving trip totals derived from said first group, a third group comprising totalizing counters giving daily totals derived from said first group, a single actuating mechanism for selectively actuating any one counter of the first group and simultaneously actuating the corresponding counters of the second and third groups, and means for separately resetting to zero each one of said groups of counters, whereby the first group may be reset to zero at each station, the second group at each trip, and the third group daily, substantially as described.

15. In a machine of the character described, a group of counters comprising, one for each specific kind of fare and constituting a station group, a second group comprising totalizing counters giving trip totals derived from said first group, a third group comprising totalizing counters giving daily totals derived from said first group, a single actuating mechanism for selectively actuating any one counter of the first group and simultaneously actuating the corresponding counters of the second and third groups, and means for separately resetting to zero each one of said groups of counters, whereby the first group may be set to zero at each station, the second group at each trip, and the third group daily, in combination with means for locking the resetting mechanism of the second or trip group against unauthorized operation, substantially as described.

16. In a machine of the character described, a group of counters comprising one for each specific kind of fare and constituting a station group, a second group comprising totalizing counters giving trip totals derived from said first group, a third group comprising totalizing counters giving daily totals derived from said first group, a single actuating mechanism for selectively actuating any one counter of the first group and simultaneously actuating the corresponding counters of the second and third groups, and means for separately resetting to zero each one of said groups of counters, whereby the first group may be reset to zero at each station, the second group at each trip, and the third group daily, said second and third groups each comprising a total cash-adding counter upon which all of the cash counters of the first group totalize, substantially as described.

17. In a machine of the character described, a group of counters comprising one for each specific kind of fare and constituting a station group, a second group comprising totalizing counters giving trip totals derived from said first group, a third group comprising totalizing counters giving daily totals derived from said first group, a single actuating mechanism for selectively actuating any one counter of the first group and simultaneously actuating the corresponding counters of the second and third groups, and means for separately resetting to zero each one of said groups of counters, whereby the first group may be reset to zero at each station, the second group at each trip, and the third group daily, said second and third groups each comprising a total cash-adding counter on which all of the cash counters of the first group totalize, and also an adding counter which is actuated by each complete movement of the actuating mechanism, substantially as described.

18. In a machine of the character described, two rows of printing counters, one row comprising station record counters, the other row comprising trip total record counters and daily total record counters, means for separately resetting to zero the station record counters, the trip record counters and the daily record counters, and selective printing mechanism for printing an exclusive record either from the first row of counters or the second row of counters, substantially as described.

19. In a machine of the character described, two rows of printing counters, one row comprising station record counters, the other row comprising trip total record counters and daily total record counters, means for separately resetting to zero the station record counters, the trip record counters and the daily record counters, and selective printing mechanism for printing an exclusive record either from the first row of counters or the second row of counters, separate conductor's and cashier's keys controlling said printing mechanism, and means whereby said printing mechanism is operative to print only from one or the other of said rows when the corresponding key is in position, substantially as described.

20. In a machine of the character described, two rows of printing wheels, one row constituting a station record row and comprising a plurality of specific fare printing counters, a total passenger printing counter and a station printing wheel, with means for resetting all of said counters to zero and for simultaneously actuating the station printing wheel, the other row comprising trip total printing counters, daily total printing counters, and a trip number printing counter, with means for separately resetting to zero the trip and daily total printing counters, and for actuating the trip number printing counter when the trip total printing counters are so reset, and selective printing mechanism for printing an exclusive record from either of said row of printing wheels, substantially as described.

21. A machine of the character described, comprising a register proper having a normally locked setting mechanism, a normally locked actuating mechanism, two rows of printing counters, one comprising a group of specific fare counters selectively operated by said setting and actuating mechanisms, said row being adapted to produce a station record, the second row comprising two groups of totalizing counters giving totals derived from the first group and respectively adapted to produce trip records and daily records, means for separately resetting to zero the three groups of counters, a normally locked selective printing mechanism for printing a record from either one of the two rows of counters, separate conductor's and cashier's keys, means controlled by the conductor's key for unlocking the setting, actuating and printing mechanisms and setting the printing mechanism to print from the station record row only, and means controlled by the other key for unlocking the printing mechanism and setting the same to print from the second row only, substantially as described.

22. A machine of the character described, comprising a register proper having a normally locked setting mechanism, a normally locked actuating mechanism, two rows of printing counters, one comprising a group of specific fare counters selectively operated by said setting and actuating mechanisms, said row being adapted to produce a station record, the second row comprising two groups of totalizing counters giving totals derived from the first group and respectively adapted to produce trip records and daily records, means for separately resetting to zero the three groups of counters, a normally locked selective printing mechanism for printing a record from either one of the two rows of counters, separate conductor's and cashier's keys, means controlled by the conductor's key for unlocking the setting, actuating and printing mechanisms and setting the printing mechanism to print from the station record row only, and means controlled by the cashier's key for unlocking the printing mechanism and setting the same to print from the second row only, the trip resetting mechanism being normally locked, and means controlled by the cashier's key being provided for unlocking said trip resetting mechanism, substantially as described.

23. A machine of the character described, comprising a register proper having a normally locked setting mechanism, a normally locked actuating mechanism, two rows of printing counters, one comprising a group of specific fare counters selectively operated by said setting and actuating mechanisms, said row being adapted to produce a station record, the second row comprising two groups of totalizing counters giving totals derived from the first group and respectively adapted to produce trip records and daily records, means for separately resetting to zero the three groups of counters, a normally locked selective printing mechanism for printing a record from either one of the two rows of counters, separate conductor's and cashier's keys, means controlled by the conductor's key for unlocking the setting, actuating and printing mechanisms and setting the printing mechanism to print from the station record row only, means controlled by the other key for unlocking the printing mechanism and setting the same to print from the second row only, and identifying means controlled by said keys whereby an identifying mark corresponding with the key is impressed upon the corresponding record, substantially as described.

24. In a machine of the character described, an actuator, a plurality of counters for specific amounts, a setting shaft, means whereby the rotation of said shaft successively brings the specific counters into operative relation with the operator, a cash-adding counter, means intermediate said setting shaft and cash adding counter for conforming the extent of the motion of said counter to the specific counter in operative relation with the actuator, and means intermediate the actuator and cash-adding counter for operating the latter from the former, substantially as described.

25. In a machine of the character described, an actuator, a plurality of counters for specific amounts, a setting shaft, means whereby the rotation of said shaft successively brings the specific counters into operative relation with the actuator, a cash-adding counter, a second shaft operatively connected with a cash-adding counter, a controlling cam, mechanism connecting said cam and the setting shaft to cause the two to move proportionately, and an operating connection between the actuator and said second shaft, said connection being controlled by said cam, whereby the position of said cam determines the extent of the movement imparted to said shaft and to the cash-adding counter, substantially as described.

26. In a machine of the character described, an actuator, a plurality of specific fare printing counters comprising counters for different cash fares and for fares other than cash, a setting shaft, means whereby the rotation of said shaft successively brings the specific fare counters into operative relation with the actuator, a cash-adding counter, means between said setting shaft and cash-adding counter for preventing motion of the cash adding counter when the specific fare counter for a non-cash fare is in operative relation with the actuator and for causing the extent of motion of said cash-adding counter to conform to the specific cash fare counter in operative relation with the actuator, and means between the actuator and cash-adding counter for operating the latter from the former, substantially as described.

27. In a machine of the character described, an actuator, a plurality of counters for specific fares, both cash fares and other than cash fares, a setting shaft, means whereby the rotation of said shaft successively brings the specific fare counters into operative relation with the actuator, a cash-adding counter, a second shaft operatively connected with the cash-adding counter, a controlling cam, mechanism connecting said cam and the setting shaft to cause them to move proportionately, and an operating connection between the actuator and said second shaft, said connection being controlled by said cam, whereby no motion is transmitted from the actuator to said shaft or to the cash-adding counter when a specific fare counter other than cash is operatively connected with the actuator, and whereby the extent of the motion imparted from the actuator to said shaft and cash-adding counter is proportioned to the amount of the cash fare of any specific cash fare counter in operative relation with the actuator, substantially as described.

28. In a machine of the character described, an actuator, detail counters, a setting shaft for connecting at will any one of said detail counters with the actuator, two cash-adding counters, means for separately resetting the same to zero, a shaft, the extent of motion whereof is controlled by the position of the setting mechanism, and separate gear trains connecting said shaft and the two cash-adding counters, each of said gear trains transmitting motion in one direction only, from the shaft to the counter, substantially as described.

29. In a machine of the character described, an actuator, a plurality of specific fare counters, a setting mechanism for connecting at will any one of said counters with the actuator, said setting mechanism comprising a setting shaft, a cash-adding counter, a second shaft operatively connected with said cash-adding counter, a controlling cam loosely mounted on said shaft and provided with a gear, a gear on the setting shaft, a rack-bar meshing with said gears, a ratchet wheel secured on said second shaft, a part loosely mounted on said second shaft and provided with a pawl which engages said ratchet wheel and cam alternatively, and means for imparting motion from the actuator to said pawl-bearing part, substantially as described.

30. In a machine of the character described, an actuator, a plurality of specific fare counters, a setting mechanism for connecting at will any one of said counters with the actuator, said setting mechanism comprising a setting shaft, a cash-adding counter, a second shaft operatively connected with said cash-adding counter, a controlling cam loosely mounted on said shaft and provided with a gear, a gear on the setting shaft, a rack-bar meshing with said gears, a ratchet wheel secured on said second shaft, a part loosely mounted on said second shaft and provided with a pawl which engages said ratchet wheel and cam alternatively, and means for imparting motion from the actuator to said pawl-bearing part, said means comprising a rack-bearing slide engaging the actuator, and a gear meshing with said rack and connected with the pawl-bearing member so as to rotate therewith, substantially as described.

31. In a machine of the character described, a group of printing counters for printing a record at each station, a station printing wheel associated with said group, and means for simultaneously resetting to zero the counters of said group and advancing the station printing wheel one step, substantially as described.

32. In a machine of the character described, a group of printing counters for printing a record at each station, a second group of totalizing counters for printing a record at the end of a trip, a station printing wheel associated with the first mentioned group, means for simultaneously resetting the counters of said first mentioned group to zero and advancing the station printing wheel one step, a trip number printing counter associated with the second group, and separate means for resetting the counters of said second group to zero and simultaneously advancing the trip number printing counter one step, substantially as described.

33. In a machine of the character described, a group of station record printing counters, a second group of trip record printing counters and a third group of daily record printing counters, a trip number printing counter, and separate means for independently resetting to zero the counters of each group, in combination with means whereby the resetting to zero of the trip record group of counters advances the trip number printing counter one step, and means whereby the resetting of the daily record counters to zero resets the trip number printing counter to zero, substantially as described.

34. In a machine of the character described, a station printing wheel, means for actuating said wheel comprising a shaft rotated intermittently in one direction only, and means for automatically reversing the direction of rotation of the station printing wheel relatively to said shaft after a predetermined number of actuations thereof, substantially as described.

35. In a machine of the character described, a group of station record printing counters, a resetting shaft therefor, a station printing wheel, and connecting mechanism between said resetting shaft and station printing wheel whereby said wheel is advanced one step when said shaft is operated to reset the printing counters, substantially as described.

36. In a machine of the character described, a group of station record printing counters, a resetting shaft therefor, a station printing wheel, and connecting mechanism between said resetting shaft and station printing wheel whereby said wheel is advanced one step when said shaft is operated to reset the printing counters, said counters and station printing wheel being mounted on said resetting shaft, substantially as described.

37. In a machine of the character described, a group of station record printing counters, a resetting shaft therefor, a station printing wheel, and connecting mechanism between said resetting shaft and station printing wheel whereby said wheel is advanced one step when said shaft is operated to reset the printing counters, said connecting mechanism comprising means for reversing the direction of rotation of the wheel relatively to the shaft after a predetermined number of actuations thereof, substantially as described.

38. In a machine of the character described, a resetting shaft, a station printing wheel loosely mounted thereon, a vibrating lever actuated by said resetting shaft, a pawl-supporting arm connected to and vibrating with said lever, a ratchet wheel and cam rotating with the station printing wheel, a double pawl pivoted on the pawl-supporting arm, provided with pawl arms to engage the ratchet wheel in either direction, an intermediate arm arranged in the path of the cam, and a fourth arm projecting in the opposite direction, and a spring actuated detent mounted on the pawl-supporting arm and adapted to engage the fourth arm of said pawl on either side, substantially as described.

39. In a machine of the character described, the combination, with printing counters, and a normally locked printing mechanism for printing a record therefrom, of an identifying device comprising a plurality of wheels having printing characters thereon, permanently mounted in the machine, said wheels having selective projections, and a plurality of keys having corresponding selective projections of varying character, whereby when one of said keys is inserted and turned, the corresponding set of printing counters is turned to printing position, and means whereby the rotation of said key unlocks the printing mechanism, substantially as described.

40. A machine of the character described, comprising printing counters, setting and actuating mechanisms for said counters, and a printing mechanism for printing a record from said counters, in combination with an identifying mechanism comprising a rotatable shaft or barrel, a plurality of printing wheels mounted thereon, and having printing characters and corresponding selective projections, a key adapted to be inserted in said barrel to rotate the same and having selective projections to engage the corresponding projections of the printing wheels, a cam mounted on and rotating with said barrel, and means controlled by said cam for unlocking and locking the setting, actuating and printing mechanisms, substantially as described.

41. In a machine of the character described, a reciprocating actuator, in combination with a passenger indicating counter comprising adding wheels having notched peripheries and an actuating pawl-yoke and pawl, a spring controlled rock-shaft having locking dogs to engage said notches to prevent overthrow, an arm on said rock-shaft, and a slide connected to and moving with the actuator, provided with an arm to engage the pawl-yoke, and having a finger or projection to engage the arm of the rock-shaft, substantially as described.

42. In a machine of the character described, a passenger indicating counter comprising a resetting shaft, a plurality of adding wheels loosely mounted thereon, each wheel having eccentrically pivoted thereon a spring actuated dog, the free end of which normally projects beyond the periphery of the wheel, said dogs yielding inward to pressure in one direction only, and an arm secured to the resetting shaft and provided with a pin extending across the peripheries of the wheels to engage the dogs, substantially as described.

43. In a machine of the character described, a passenger indicating counter comprising a resetting shaft, a plurality of adding wheels loosely mounted thereon, each wheel having eccentrically pivoted thereon a spring-actuated dog, the free end of which normally projects beyond the periphery of the wheel, said dogs yielding inward to pressure in one direction only, and an arm secured to the resetting shaft and provided with a pin extending across the peripheries of the wheels to engage the dogs, the projecting ends of said dogs presenting to the pin an inclined face on one side and a substantially radial face on the other side, substantially as described.

44. In a machine of the character described, a plurality of specific fare counters, some of which are cash fare counters, and others of which are counters for fares other than cash, selective mechanism for operating any one of said counters, a totalizing counter for fares other than cash, means for actuating said totalizing counter when any one of the counters for fares other than cash is actuated, a total cash adding counter, and means for adding onto said cash adding counter an amount equal to the specific cash fare of any one of the cash fare counters when said cash fare counter is actuated, substantially as described.

45. In a machine of the character described, a plurality of specific fare printing counters, some of which are cash fare printing counters and others of which are printing counters for fares other than cash, selective mechanism for operating any one of said counters, a totalizing printing counter for fares other than cash, means for actuating said counter when any one of the printing counters for fares other than cash is actuated, a total cash adding printing counter, and means for adding on said cash adding printing counter an amount equal to the specific cash fare of any one of the cash fare printing counters when said cash fare printing counter is actuated, substantially as described.

46. In combination, in a fare recorder, counting mechanism, counting disks operated thereby, key-operated identification disks, a trip disk, and means for turning said trip disk independently of the counting mechanism or identification key.

47. In a machine of the character described, printing counters, in combination, with setting, actuating and printing mechanism, locking bars for said mechanism, a locking lever actuating said bar and an identifying mechanism comprising a rotatory key directly engaging and locking said locking lever, substantially as described.

In testimony whereof, I affix my signature in presence of two witnesses.

WILFRED I. OHMER.

Witnesses:
E. O. HOGAN,
HARRIET HAMMAKER.